US012783775B2

(12) United States Patent
Shi et al.

(10) Patent No.: US 12,783,775 B2
(45) Date of Patent: Nov. 3, 2026

(54) HIGH DENSITY TRANSISTOR AND ROUTING TRACK ARCHITECTURE

(71) Applicant: Intel Corporation, Santa Clara, CA (US)

(72) Inventors: Quan Shi, Portland, OR (US); Patrick Morrow, Portland, OR (US); Charles Henry Wallace, Portland, OR (US); Lars Liebmann, Mechanicville, NY (US); Thi Nguyen, Beaverton, OR (US); Sivakumar Venkataraman, Hillsboro, OR (US); Nikolay Ryzhenko Vladimirovich, Beaverton, OR (US); Xinning Wang, Hillsboro, OR (US); Douglas Stout, Aurora, CO (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 18/068,601

(22) Filed: Dec. 20, 2022

(65) Prior Publication Data

US 2024/0202415 A1 Jun. 20, 2024

(51) Int. Cl.
*G06F 30/392* (2020.01)
*G06F 30/394* (2020.01)
*G06F 119/18* (2020.01)

(52) U.S. Cl.
CPC .......... *G06F 30/392* (2020.01); *G06F 30/394* (2020.01); *G06F 2119/18* (2020.01)

(58) Field of Classification Search
CPC ... G06F 30/392; G06F 30/394; G06F 2119/18
USPC .......................................................... 716/119
See application file for complete search history.

(56) References Cited

U.S. PATENT DOCUMENTS

2009/0242953 A1* 10/2009 Booth, Jr. ............ H10D 84/811 257/E27.084
2014/0061936 A1* 3/2014 Moroz .................. H10W 20/20 257/E21.597
2016/0034620 A1* 2/2016 Kawa .................... G06F 30/398 716/136
2017/0358565 A1* 12/2017 Hensel ................... H10D 89/10
2020/0373242 A1* 11/2020 Hiblot .................. H10D 88/101
2021/0358849 A1 11/2021 Chen et al.
2022/0328408 A1 10/2022 Do et al.
2022/0367439 A1* 11/2022 Kang .................... G06F 30/392
2023/0101678 A1* 3/2023 Chu ....................... H10D 89/10 716/119
2023/0259685 A1* 8/2023 Tzeng ..................... G06F 30/39 716/100

* cited by examiner

*Primary Examiner* — Suresh Memula
(74) *Attorney, Agent, or Firm* — Akona IP PC

(57) ABSTRACT

Transistor cell architectures have three MO routing tracks within a single cell height. The cell architectures include at least one p-type transistor formed over a p-type diffusion region and at least one n-type transistor formed over an n-type diffusion region. Each diffusion region extends primarily in a particular direction, and the MO routing tracks extending in the same direction as the diffusion regions. One MO routing track may be formed over each of the diffusion regions, and a third MO routing track formed between the diffusion regions.

20 Claims, 17 Drawing Sheets

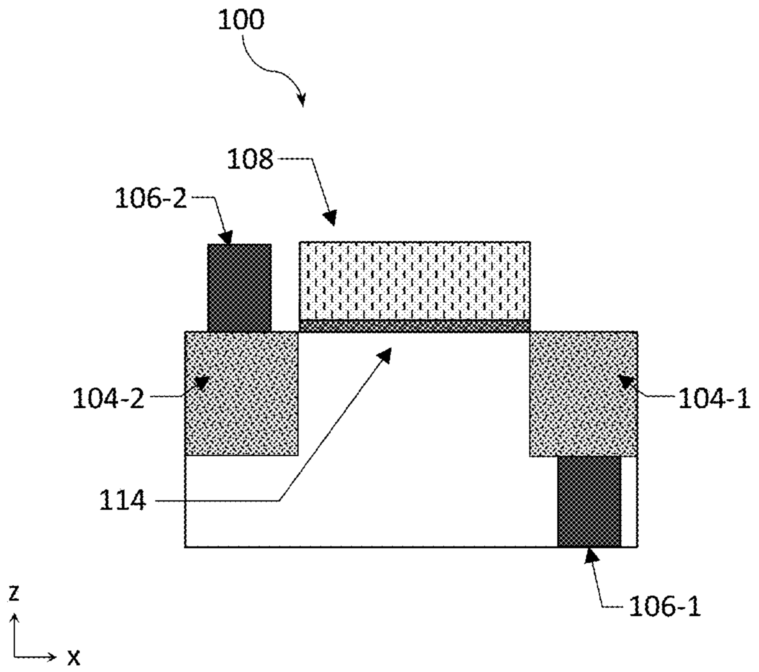
FIG. 1

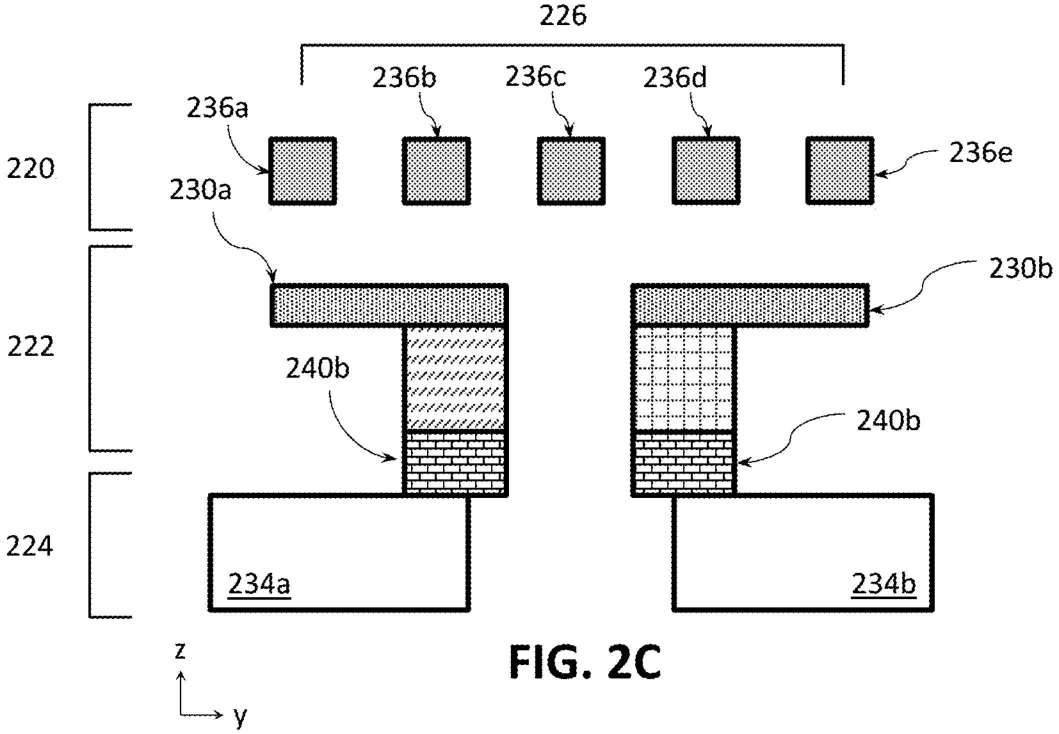
FIG. 2C
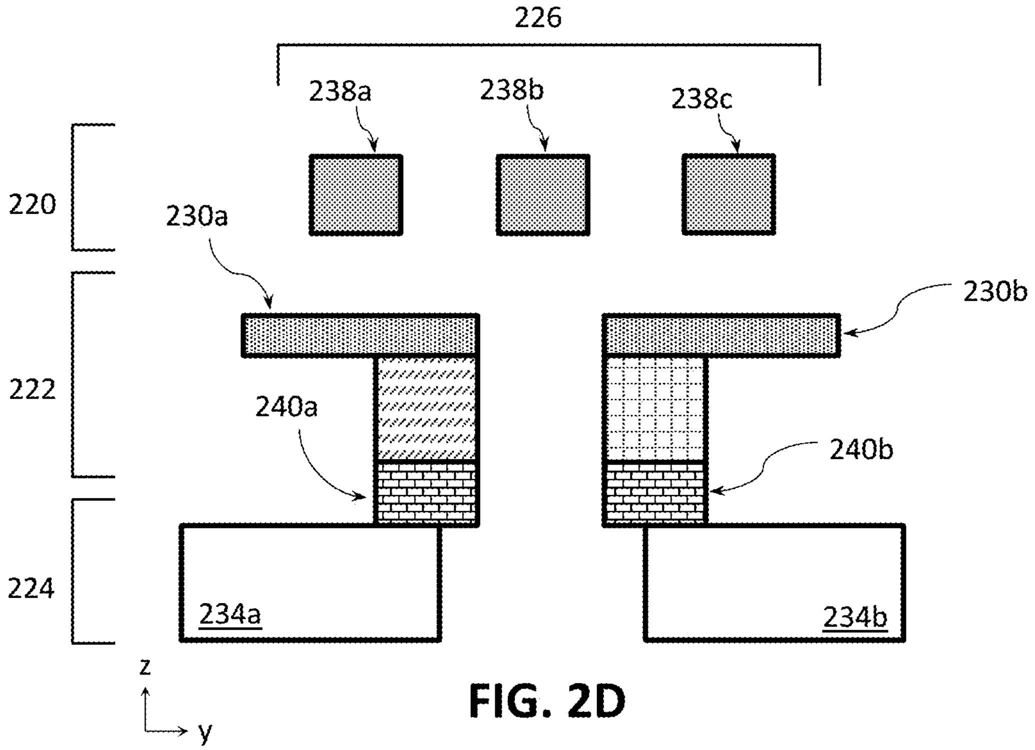
FIG. 2D

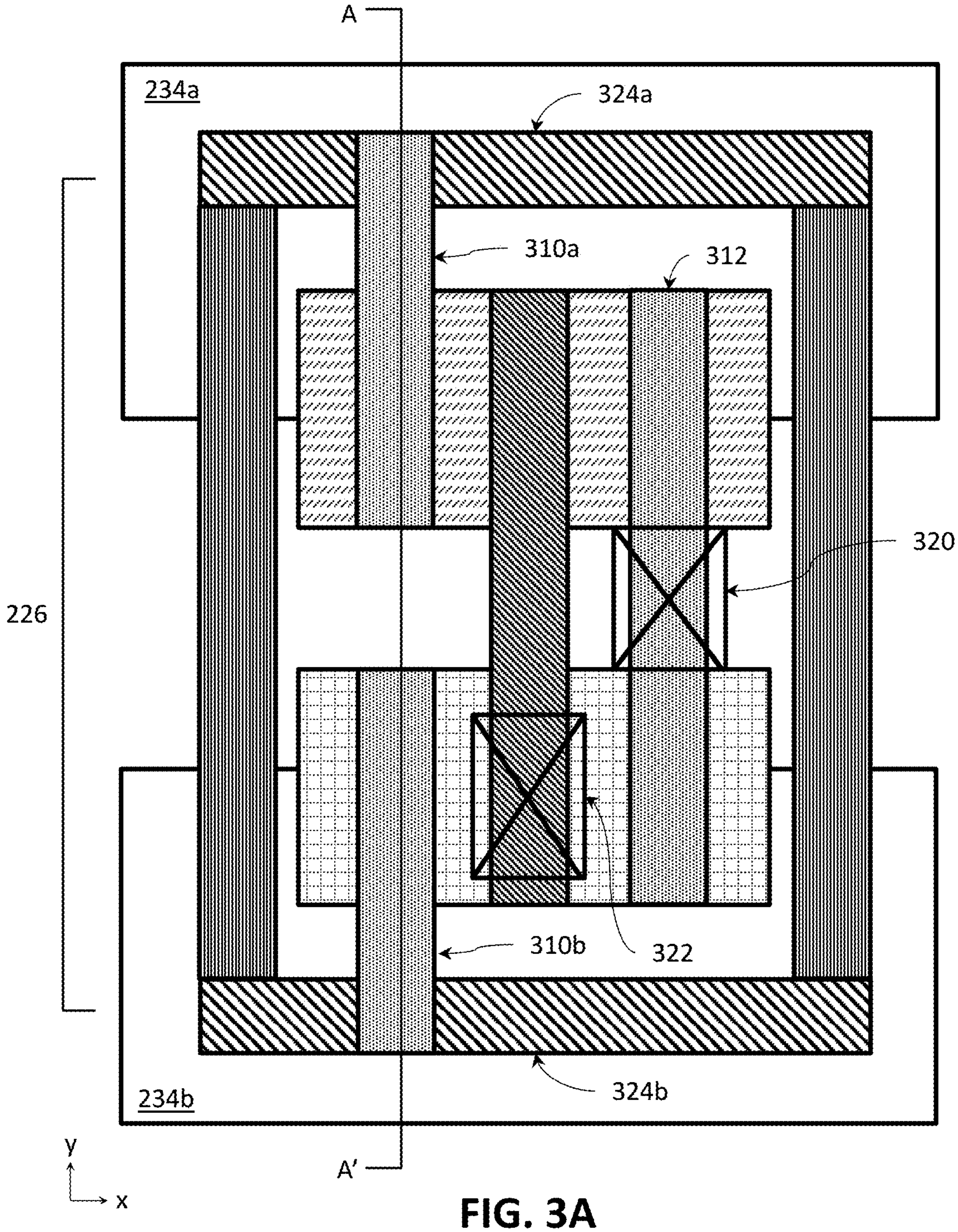
FIG. 3A

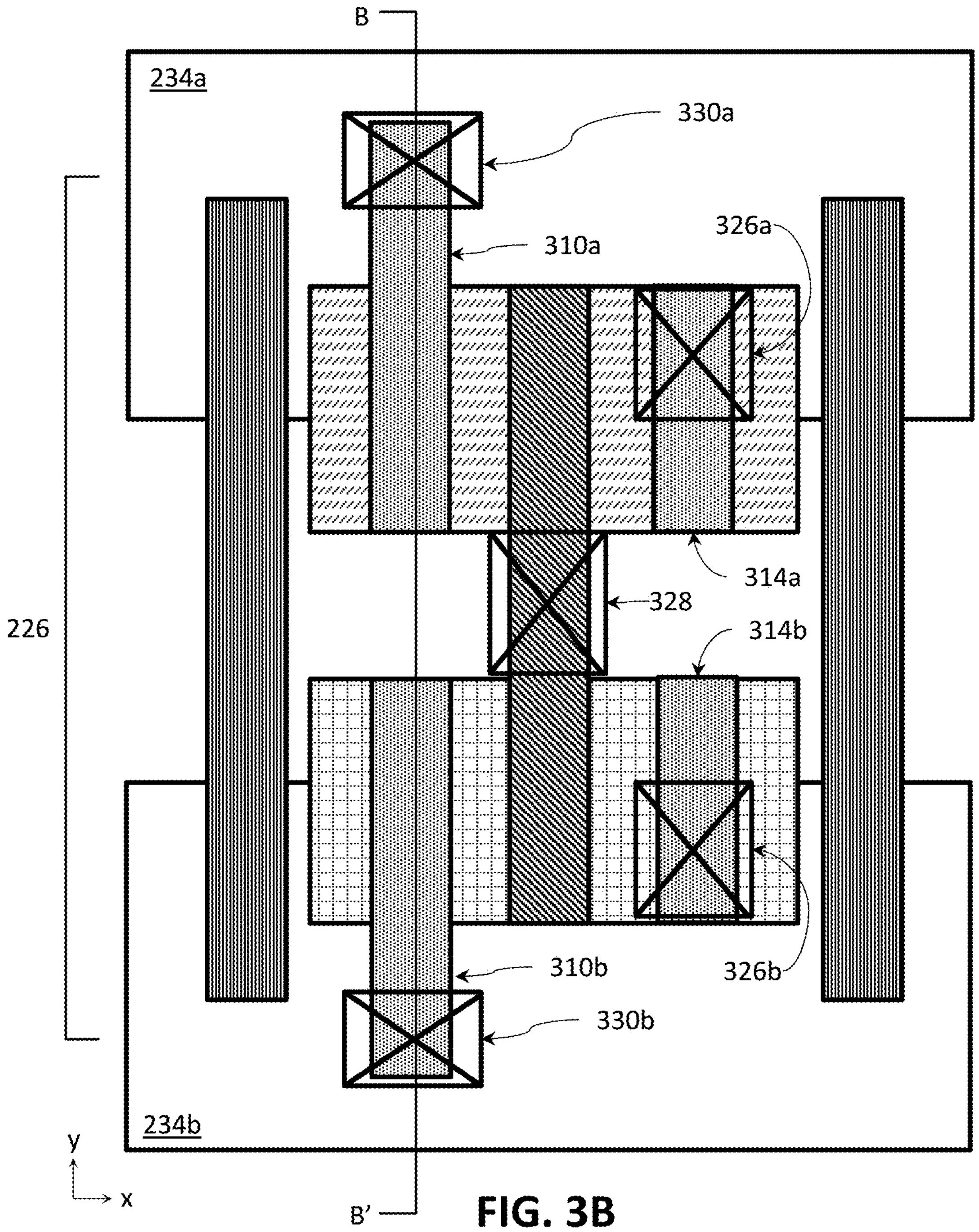
FIG. 3B

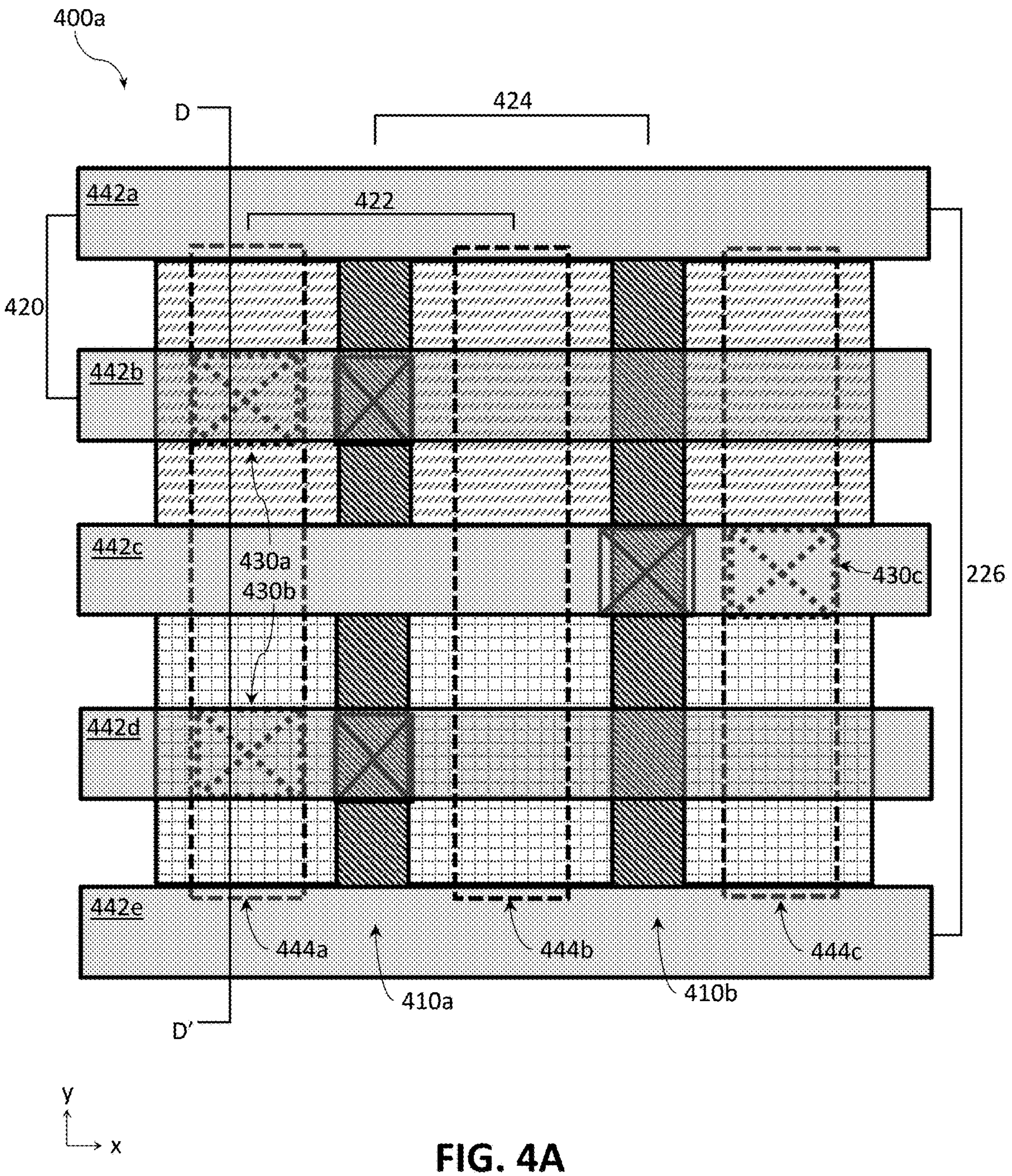
FIG. 4A

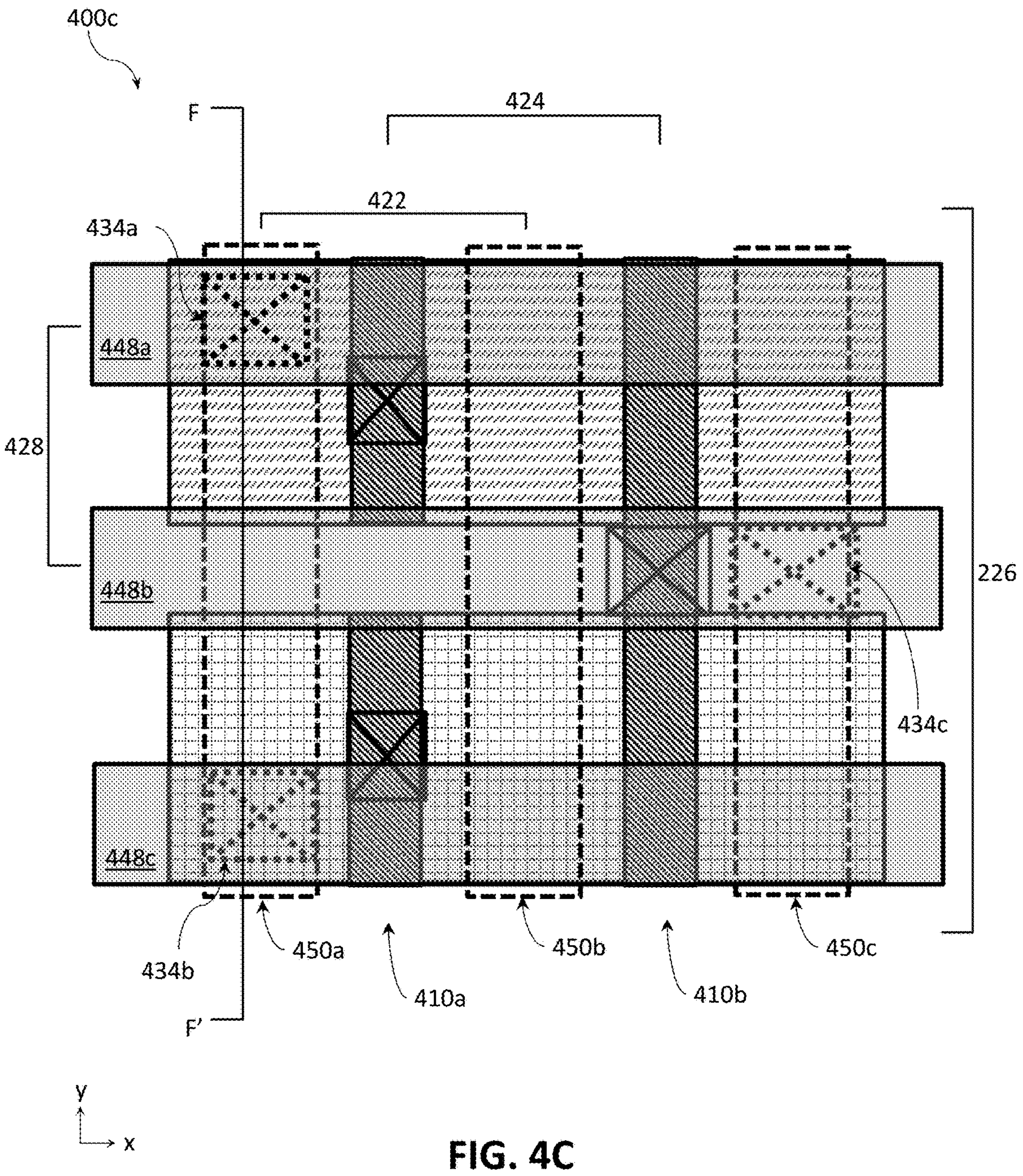
FIG. 4C

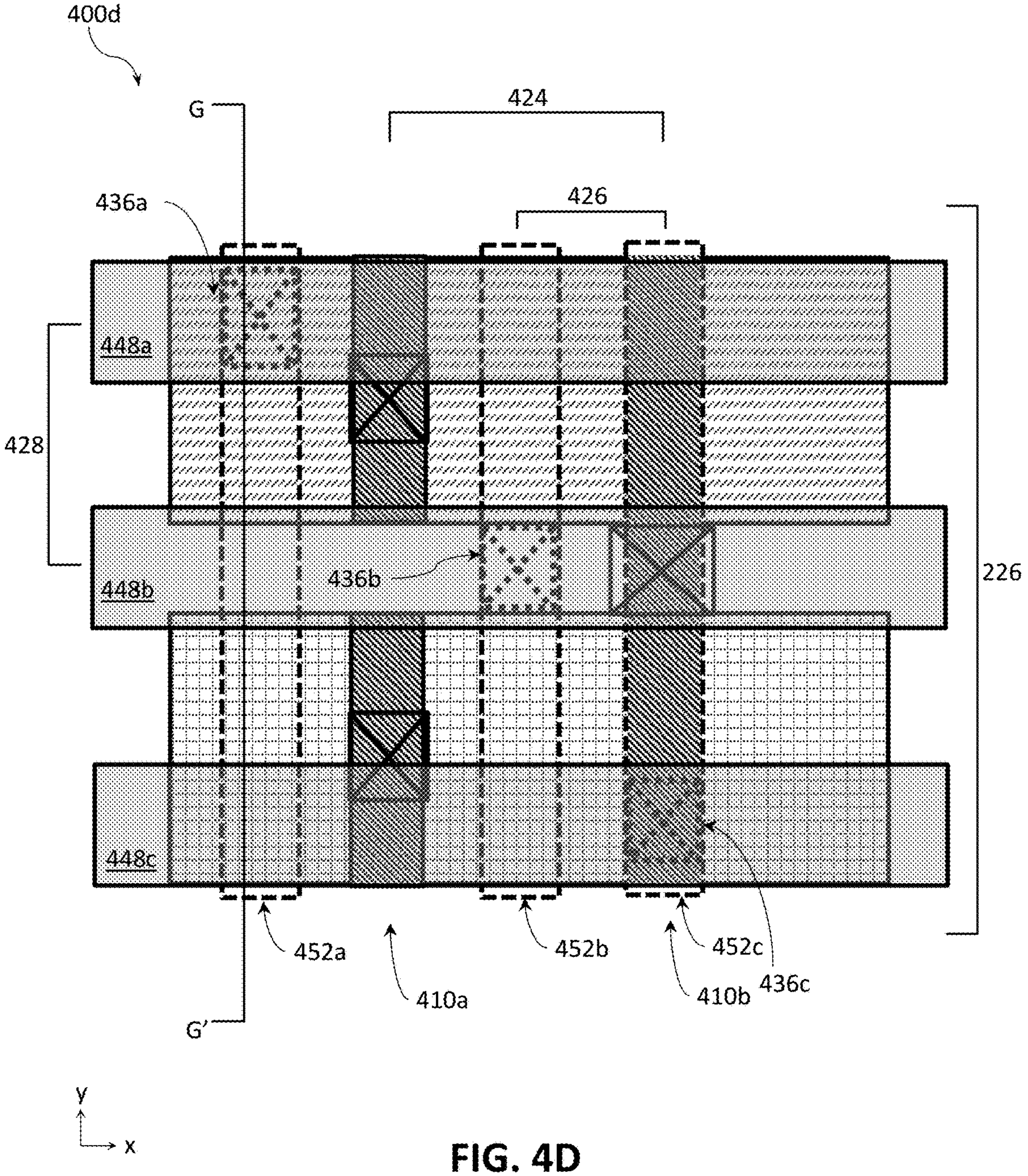
FIG. 4D

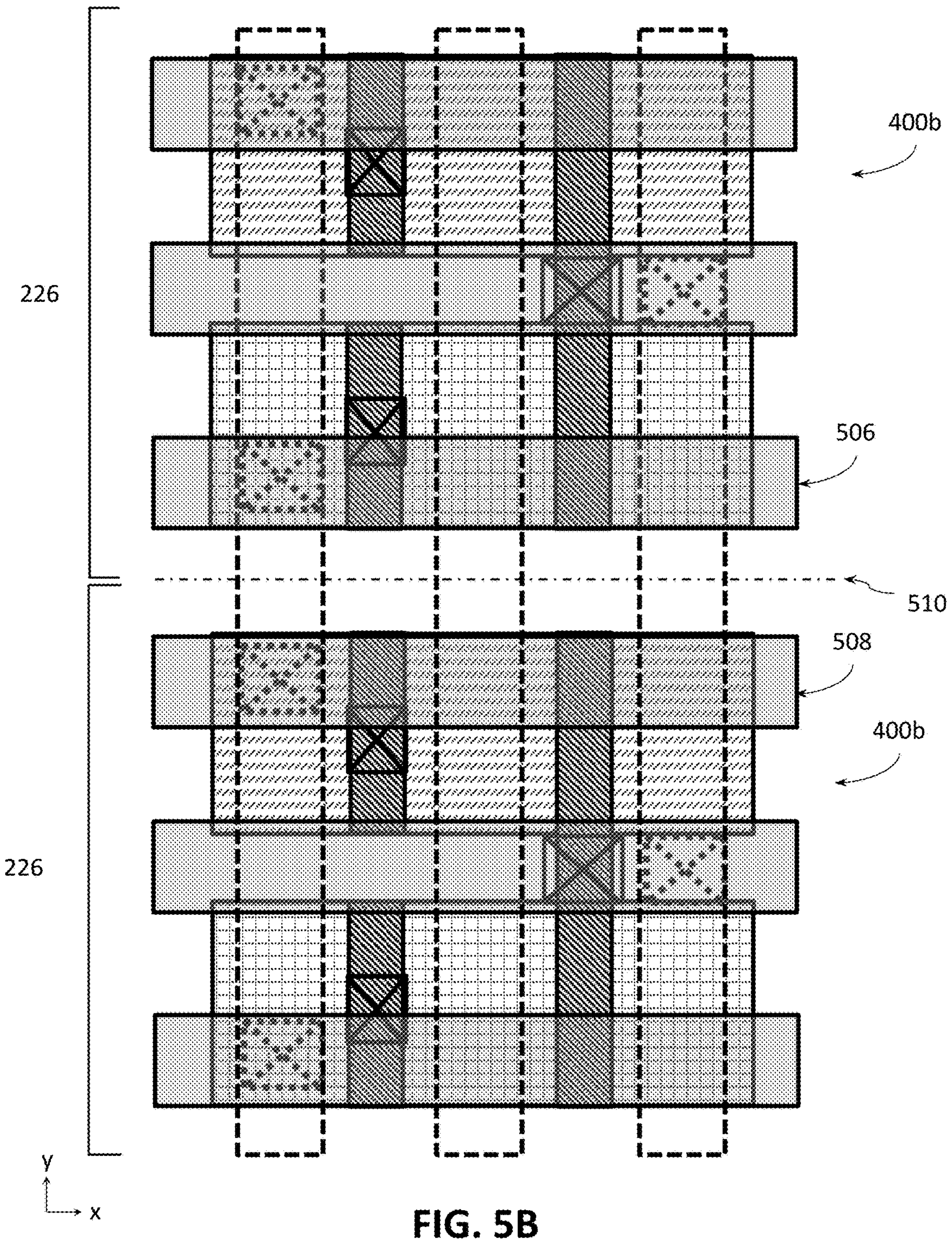
FIG. 5B

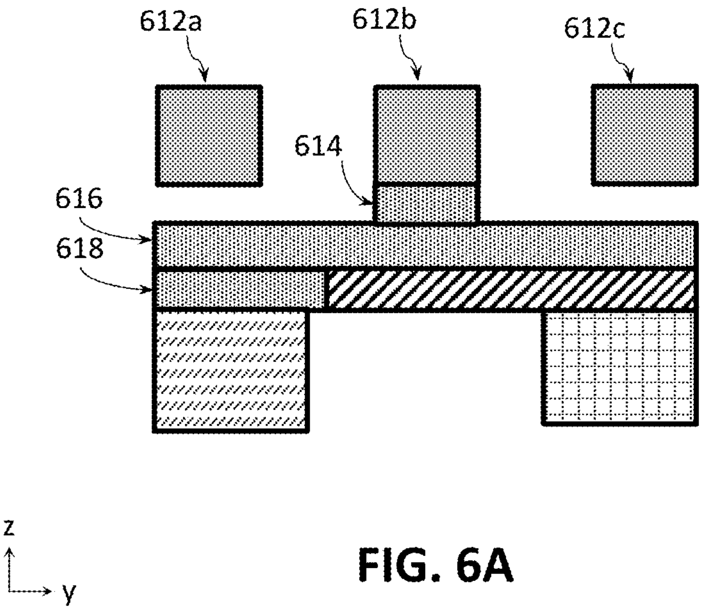
FIG. 6A
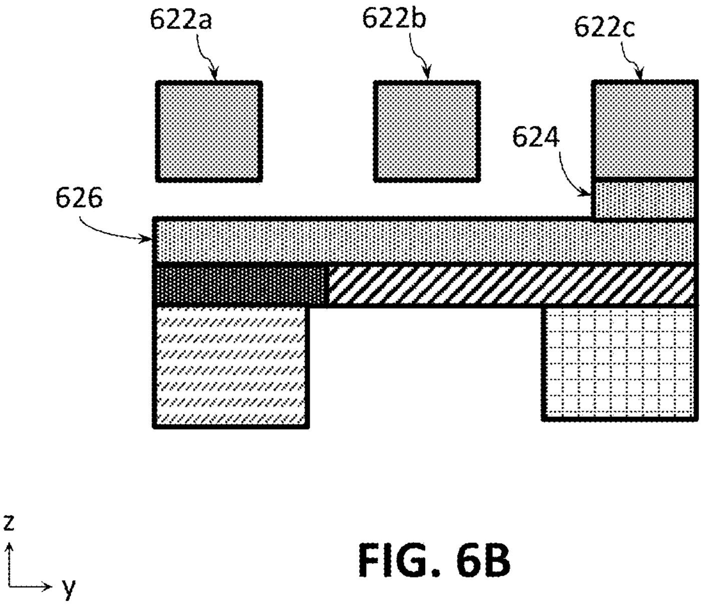
FIG. 6B

HIGH DENSITY TRANSISTOR AND ROUTING TRACK ARCHITECTURE

BACKGROUND

Integrated circuit devices typically include a device layer, in which transistors are formed, and metal layers, which couple to the device layer via interconnects and provide signal and/or power to the device layer. Multiple metal layers, referred to as metal 0 (M0), metal 1 (M1), metal 2 (M2), etc., may be formed over the device layer, with the M0 layer nearest to the device layer. The metal layers may include via portions and trench portions. A trench portion of a given metal layer is configured for transferring signals and/or power along electrically conductive (e.g., metal) lines, also referred to as "trenches", extending along the given metal layer. A via portion of a given metal layer is configured for transferring signals and power through electrically conductive vias extending between adjacent metal layers, e.g., to a metal layer above or below the given metal layer. Accordingly, vias connect metal structures (e.g., metal lines or vias) from one metal layer to metal structures of an adjacent metal layer.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 provides a schematic illustration of a cross-sectional view of an example transistor, according to some embodiments of the present disclosure.

FIGS. 2A-2D provide cross-sections of four example cell and routing track architectures, according to some embodiments of the present disclosure.

FIGS. 3A-3C provide top-down views illustrating power delivery options for transistors having the cell and routing track architectures disclosed herein, according to some embodiments of the present disclosure.

FIGS. 4A-4D provide top-down views illustrating routing tracks for high density cell architectures, according to some embodiments of the present disclosure.

FIGS. 5A and 5B provide top-down views of pairs of adjacent cells, according to some embodiments of the present disclosure.

FIGS. 6A and 6B provide cross-section views illustrating example routing between a diffusion region and a M0 routing track, according to some embodiments of the present disclosure.

DETAILED DESCRIPTION

Overview

Figure 2A:
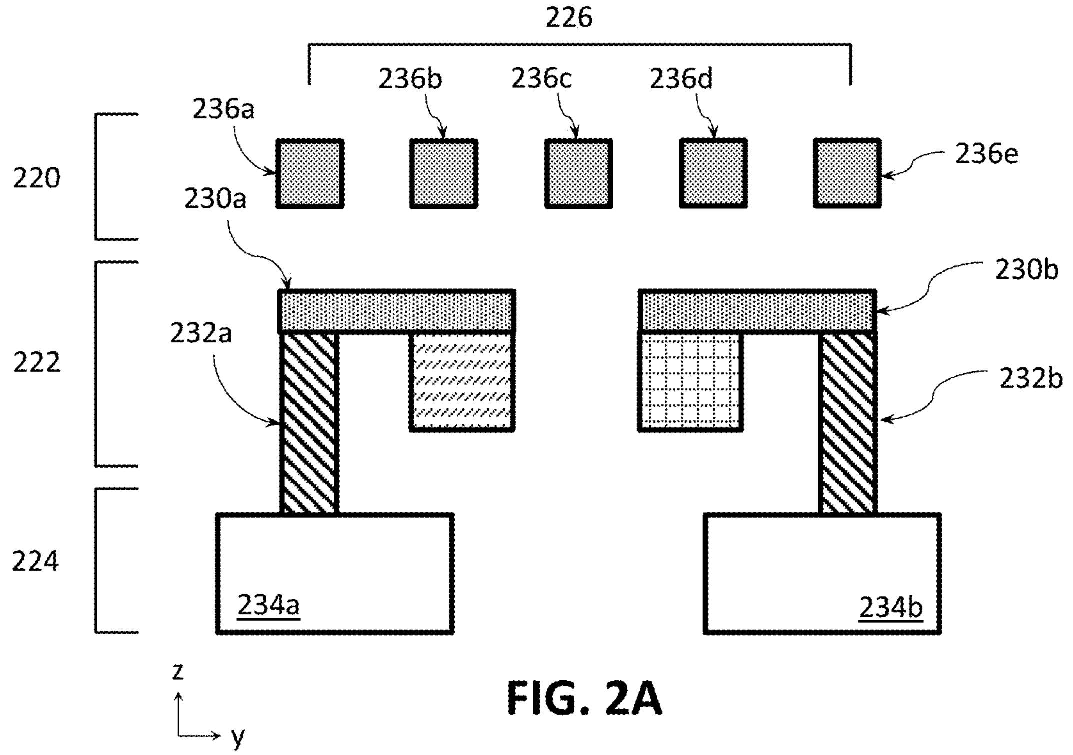

Metal 0, or M0, refers to the first metal layer formed over a device layer. If metal layers are formed over the front side of a device, M0 is the lowest metal layer, and additional metal layers (M1, M2, M3, etc.) are formed over the M0 layer. Each metal layer has routing tracks, and metal lines are formed along the routing tracks. For example, a given routing track may extend across a metal layer, and some portions of the routing track may have metal trenches formed therein, while other portions may have an insulating material formed therein. The routing tracks for a given metal layer are often evenly spaced within the layer. The spacing between tracks, and in particular the distance from the center of one routing track to the center of another adjacent routing track, is referred to as pitch.

The M0 layer, which is closest to the device layer, typically has the tightest pitch of the metal layers. Newer designs require increasingly tight M0 spacing, e.g., as the transistor size in the underlying device layer decrease in size with process improvements. More specifically, the pitch of the M0 layer is generally limited by the height of high density standard cell library and its architecture, including the number of M0 tracks within the cell height, where a cell refers to an arrangement of one or more transistors. For any given cell height, architectures with more M0 routing tracks within the cell require tighter M0 pitch than architectures with fewer M0 tracks. Current cell libraries include cells with two-transistor heights and four M0 tracks. As the transistors grow smaller, if the number of M0 routing tracks stays consistent, the decreasing cell height requires tighter M0 pitch.

More specifically, in future processes, the standard cell height may be 100 nm or even less, e.g., 75 nm or smaller. Such short cell heights require very tight M0 pitch when using existing routing track architectures, e.g., an architecture with four M0 tracks in the cell height. Producing metal layers with such small pitch significantly increases process complexity and increases the risk of forming shorts between metal lines.

Embodiments of the present disclosure may improve on at least some of the challenges and issues described above by providing cell architectures with fewer M0 routing tracks within a single cell height, e.g., with three M0 routing tracks instead of four or more. The cell architectures described herein include at least one p-type transistor formed over a p-type diffusion region and at least one n-type transistor formed over an n-type diffusion region. Each diffusion region extends primarily in a particular direction (e.g., the x-direction), and the M0 routing tracks extend in the same direction as the diffusion regions. In particular, one M0 routing track may be formed over each of the diffusion regions, and a third M0 routing track formed between the diffusion regions.

In some embodiments, the cell boundaries are between adjacent M0 routing tracks, and adjacent routing tracks may be within adjacent cells. In other embodiments, the cell boundaries are centered along M0 routing tracks. In such embodiments, an M0 routing track is along the cell boundary, and neither cell is coupled to the M0 routing track along the cell boundary.

In various embodiments, power delivery to the cell can be delivered from the back side, i.e., a side opposite from the M0 layer and upper metal layers. The power may travel through a backside metal layer, referred to as BMO, which is coupled to the transistors by a via or contact. For example, one of the source regions of each transistor may be coupled to a deep via at boundary (DVB), to a deep trench contact (DTCN), or to a direct backside contact for power delivery.

Additional metal layers are formed over the M0 layer. The M1 layer, which is formed over the M0 layer, has routing tracks extending in a direction perpendicular to the routing tracks of the M0 layer. The routing tracks of the M1 layer may have different arrangements, e.g., the routing tracks of the M1 layer may have a pitch equal or similar to the gate pitch, or a tighter pitch, e.g., the M1 routing tracks may align to the gates, source regions, and drain regions of the underlying transistors.

In the following, some descriptions may refer to a particular source or drain region or contact being either a source region/contact or a drain region/contact. However, unless specified otherwise, which region/contact of a transistor is considered to be a source region/contact and which region/contact is considered to be a drain region/contact is not important because, as is common in the field of FETs, designations of source and drain are often interchangeable. Therefore, descriptions of some illustrative embodiments of the source and drain regions/contacts provided herein are applicable to embodiments where the designation of source and drain regions/contacts may be reversed.

As used herein, the term "metal layer" may refer to a layer above a support structure that includes electrically conductive interconnect structures for providing electrical connectivity between different IC components. Metal layers described herein may also be referred to as "interconnect layers" to clearly indicate that these layers include electrically conductive interconnect structures which may but does not have to be metal.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. As used herein, a "logic state" (or, alternatively, a "state" or a "bit" value) of a memory cell may refer to one of a finite number of states that the cell can have, e.g., logic states "1" and "0," each state represented by a different voltage of the capacitor of the cell, while "READ" and "WRITE" memory access or operations refer to, respectively, determining/sensing a logic state of a memory cell and programming/setting a logic state of a memory cell. If used, the terms "oxide," "carbide," "nitride," etc. refer to compounds containing, respectively, oxygen, carbon, nitrogen, etc., the term "high-k dielectric" refers to a material having a higher dielectric constant (k) than silicon oxide, while the term "low-k dielectric" refers to a material having a lower k than silicon oxide. The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For convenience, if a collection of drawings designated with different letters are present, e.g., FIGS. 11A-11B, such a collection may be referred to herein without the letters, e.g., as "FIG. 11."

In the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Various IC devices with transistor and routing track architectures as described herein may be implemented in, or associated with, one or more components associated with an IC or/and may be implemented between various such components. In various embodiments, components associated with an IC include, for example, transistors, diodes, power sources, resistors, capacitors, inductors, sensors, transceivers, receivers, antennas, etc. Components associated with an IC may include those that are mounted on IC or those connected to an IC. The IC may be either analog or digital and may be used in a number of applications, such as microprocessors, optoelectronics, logic blocks, audio amplifiers, etc., depending on the components associated with the IC. The IC may be employed as part of a chipset for executing one or more related functions in a computer.

Example Transistor Arrangement

FIG. 1 provides a schematic illustration of a cross-sectional view of an example transistor 100, according to some embodiments of the present disclosure. The transistor 100 may be included in a cell architecture, e.g., the architectures described herein. The transistor 100 may be included in various regions/locations in an IC device. For example, the transistor 100 may be used as, e.g., a logic transistor in a compute logic layer. In another example, the transistor 100 may be used as, e.g., an access transistor in a memory layer.

A number of elements labeled in FIG. 1 are illustrated in this figure with different patterns, with a legend showing the correspondence between the reference numerals and patterns being provided at the bottom of the drawing page containing FIG. 1. For example, the legend illustrates that FIG. 1 uses different patterns to show a channel material 102, source or drain ("S/D") regions 104, contacts 106 to S/D regions, a gate electrode 110, and a gate dielectric 112. The view shown in FIG. 1 is intended to show relative arrangements of various elements therein, and various IC devices, or portions thereof, may include other elements or components that are not illustrated (e.g., any further materials, such as spacer materials that may surround the gate stack of the transistor 100, etch-stop materials, etc.).

In general, a FET, e.g., a metal oxide semiconductor (MOS) FET (MOSFET), is a three-terminal device that includes source, drain, and gate terminals and uses electric field to control current flowing through the device. A FET typically includes a channel material, a source region, and a drain region provided in the channel material, and a gate stack that includes a gate electrode material, alternatively referred to as a "work function" (WF) material, provided over a portion of the channel material between the source and the drain regions, and, optionally, also includes a gate dielectric material between the gate electrode material and the channel material. This general structure is shown in FIG. 1, illustrating a channel material 102, S/D regions 104 (shown as a first S/D region 104-1, e.g., a source region, and a second S/D region 104-2, e.g., a drain region), contacts 106 to S/D regions (shown as a first S/D contact 106-1, providing electrical contact to the first S/D region 104-1, and a second S/D contact 106-2, providing electrical contact to the second S/D region 104-2), and a gate stack 108, which includes at least a gate electrode 110 and may also, optionally, include a gate dielectric 112.

In general, implementations of the present disclosure may be formed or carried out on a support structure, e.g., a support structure under the channel material 102. The support structure (not specifically shown in FIG. 1) may be, e.g., a substrate, a die, a wafer, or a chip. For example, the support structure may be the wafer 1500 of FIG. 7A, discussed below, and may be, or be included in, a die, e.g., the singulated die 1502 of FIG. 7B, discussed below. In some embodiments, the support structure may be a substrate that includes silicon and/or hafnium. More generally, the support structure may be a semiconductor substrate composed of semiconductor material systems including, for example, N-type or P-type materials systems. In one implementation, the semiconductor substrate may be a crystalline substrate formed using a bulk silicon or a silicon-on-insulator (SOI) substructure. In other implementations, the semiconductor substrate may be formed using alternate materials, which may or may not be combined with silicon, that include, but are not limited to, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-V materials (i.e., materials from groups III and V of the periodic system of elements), group II-VI (i.e., materials from groups II and IV of the periodic system of elements), or group IV materials (i.e., materials from group IV of the periodic system of elements). In some embodiments, the substrate may be non-crystalline. In some embodiments, the support structure may be a printed circuit board (PCB) substrate. Although a few examples of materials from which the substrate may be formed are described here, any material that may serve as a foundation upon which a semiconductor device including any of the cell architectures described herein may be built falls within the spirit and scope of the present disclosure.

In some embodiments, the channel material 102 may be composed of semiconductor material systems including, for example, N-type or P-type materials systems. In some embodiments, the channel material 102 may include a high mobility oxide semiconductor material, such as tin oxide, antimony oxide, indium oxide, indium tin oxide, titanium oxide, zinc oxide, indium zinc oxide, gallium oxide, titanium oxynitride, ruthenium oxide, or tungsten oxide. In some embodiments, the channel material 102 may include a combination of semiconductor materials where one semiconductor material may be used for the channel portion (e.g., a portion 114 shown in FIG. 1, which is supposed to refer to the upper-most portion of the channel material 102) and another material, sometimes referred to as a "blocking material," may be used between the channel portion 114 and the support structure over which the transistor 100 is provided. In some embodiments, the channel material 102 may include a monocrystalline semiconductor, such as silicon (Si) or germanium (Ge). In some embodiments, the channel material 102 may include a compound semiconductor with a first sub-lattice of at least one element from group Ill of the periodic table (e.g., Al, Ga, In), and a second sub-lattice of at least one element of group V of the periodic table (e.g., P, As, Sb).

For some example N-type transistor embodiments (i.e., for the embodiments where the transistor 100 is an NMOS), the channel portion 114 of the channel material 102 may advantageously include a III-V material having a high electron mobility, such as, but not limited to InGaAs, InP, InSb, and InAs. For some such embodiments, the channel portion 114 of the channel material 102 may be a ternary III-V alloy, such as InGaAs, GaAsSb, InAsP, or InPSb. For some $In_xGa_{1-x}As$ fin embodiments, In content (x) may be between 0.6 and 0.9, and may advantageously be at least 0.7 (e.g., $In_{0.7}Ga_{0.3}As$). In some embodiments with highest mobility, the channel portion 114 of the channel material 102 may be an intrinsic III-V material, i.e., a III-V semiconductor material not intentionally doped with any electrically active impurity. In alternate embodiments, a nominal impurity dopant level may be present within the channel portion 114 of the channel material 102, for example to further fine-tune a threshold voltage Vt, or to provide HALO pocket implants, etc. Even for impurity-doped embodiments however, impurity dopant level within the channel portion 114 of the channel material 102 may be relatively low, for example below $10^{15}$ dopant atoms per cubic centimeter ($cm^{-3}$), and advantageously below $10^{13}$ $cm^{-3}$.

For some example P-type transistor embodiments (i.e., for the embodiments where the transistor 100 is a PMOS), the channel portion 114 of the channel material 102 may advantageously be a group IV material having a high hole mobility, such as, but not limited to Ge or a Ge-rich SiGe alloy. For some example embodiments, the channel portion 114 of the channel material 102 may have a Ge content between 0.6 and 0.9, and advantageously may be at least 0.7. In some embodiments with highest mobility, the channel portion 114 may be intrinsic III-V (or IV for P-type devices) material and not intentionally doped with any electrically active impurity. In alternate embodiments, one or more a nominal impurity dopant level may be present within the channel portion 114, for example to further set a threshold voltage (Vt), or to provide HALO pocket implants, etc. Even for impurity-doped embodiments however, impurity dopant level within the channel portion is relatively low, for example below $10^{15}$ $cm^{-3}$, and advantageously below $10^{13}$ $cm^{-3}$.

In some embodiments, the transistor 100 may be a thin film transistor (TFT). A TFT is a special kind of a field-effect transistor made by depositing a thin film of an active semiconductor material, as well as a dielectric layer and metallic contacts, over a supporting layer that may be a non-conducting layer. At least a portion of the active semiconductor material forms a channel of the TFT. If the transistor 100 is a TFT, the channel material 102 may include a high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, if the transistor 100 is a TFT, the channel material 102 may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium telluride, molybdenite, molybdenum diselenide, tungsten diselenide, tungsten disulfide, N- or P-type amorphous or polycrystalline silicon, germanium, indium gallium arsenide, silicon germanium, gallium nitride, aluminum gallium nitride, indium phosphite, and black phosphorus, each of which may possibly be doped with one or more of gallium, indium, aluminum, fluorine, boron, phosphorus, arsenic, nitrogen, tantalum, tungsten, and magnesium, etc. In some embodiments, the channel material 102 may have a thickness between about 5 and 75 nanometers, including all values and ranges therein. In some embodiments, a thin film channel material 102 may be deposited at relatively low temperatures, which allows depositing the channel material 102 within the thermal budgets imposed on back end fabrication to avoid damaging other components, e.g., front end components such as the logic devices.

As shown in FIG. 1, a first and a second S/D region 104-1, 104-2 (together referred to as "S/D regions 104") may be included on either side of the gate stack 108, thus realizing a transistor. As is known in the art, source and drain regions (also sometimes interchangeably referred to as "diffusion regions") are formed for the gate stack of a FET. In some embodiments, the S/D regions 104 of the transistor 100 may be regions of doped semiconductors, e.g. regions of the channel material 102 (e.g., of the channel portion 114) are doped with a suitable dopant to a suitable dopant concentration, so as to supply charge carriers for the transistor channel. In some embodiments, the S/D regions 104 may be highly doped, e.g. with dopant concentrations of about $1 \cdot 10^{21}$ $cm^{-3}$, in order to advantageously form Ohmic contacts with the respective S/D contacts 106, although, in other embodiments, these regions may also have lower dopant concentrations and may form Schottky contacts in some implementations. Irrespective of the exact doping levels, the S/D regions 104 of the transistor 100 may be the regions having dopant concentration higher than in other regions, e.g. higher than a dopant concentration in a region of the channel material 102 between the first S/D region 104-1 and the second S/D region 104-2, and, therefore, may be referred to as "highly doped" (HD) regions. In some embodiments, the S/D regions 104 may generally be formed using either an implantation/diffusion process or an etching/deposition process. In the former process, dopants such as boron, aluminum, antimony, phosphorous, or arsenic may be ion-implanted into the one or more semiconductor materials of the upper portion of the channel material 102 to form the S/D regions 104. An annealing process that activates the dopants and causes them to diffuse further into the channel material 102 may follow the ion implantation process. In the latter process, the one or more semiconductor materials of the channel material 102 may first be etched to form recesses at the locations for the future S/D regions. An epitaxial deposition process may then be carried out to fill the recesses with material (which may include a combination of different materials) that is used to fabricate the S/D regions 104. In some implementations, the S/D regions 104 may be fabricated using a silicon alloy such as silicon germanium or silicon carbide. In some implementations, the epitaxially deposited silicon alloy may be doped in situ with dopants such as boron, arsenic, or phosphorous. In further embodiments, the S/D regions 104 may be formed using one or more alternate semiconductor materials such as germanium or a group III-V material or alloy. Although FIG. 1 illustrates the first and second S/D regions 104 with a single pattern, suggesting that the material composition of the first and second S/D regions 104 is the same, this may not be the case in some other embodiments of the transistor 100. Thus, in some embodiments, the material composition of the first S/D region 104-1 may be different from the material composition of the second S/D region 104-2.

As further shown in FIG. 1, S/D contacts 106-1 and 106-2 (together referred to as "S/D contacts 106"), which are formed of one or more electrically conductive materials, may be used for providing electrical connectivity to the S/D regions 104-1 and 104-2, respectively. In various embodiments, the electrically conductive materials of the S/D contacts 106 may include one or more metals or metal alloys, with materials such as copper, ruthenium, palladium, platinum, cobalt, nickel, hafnium, zirconium, titanium, tantalum, and aluminum, tantalum nitride, tungsten, doped silicon, doped germanium, or alloys and mixtures of any of these. In some embodiments, the S/D contacts 106 may include one or more electrically conductive alloys, oxides, or carbides of one or more metals. In some embodiments, the S/D contacts 106 may include a doped semiconductor, such as silicon or another semiconductor doped with an N-type dopant or a P-type dopant. Metals may provide higher conductivity, while doped semiconductors may be easier to pattern during fabrication. Although FIG. 1 illustrates the first and second S/D contacts 106 with a single pattern, suggesting that the material composition of the first and second S/D contacts 106 is the same, this may not be the case in some other embodiments of the transistor 100. Thus, in some embodiments, the material composition of the first S/D contact 106-1 may be different from the material composition of the second S/D contact 106-2.

Turning to the gate stack 108, the gate electrode 110 may include at least one P-type work function metal or N-type work function metal, depending on whether the transistor 100 is a P-type metal oxide semiconductor (PMOS) transistor or an N-type metal oxide semiconductor (NMOS) transistor. For a PMOS transistor, metals that may be used for the gate electrode 110 may include, but are not limited to, ruthenium, palladium, platinum, cobalt, nickel, and conductive metal oxides (e.g., ruthenium oxide). For an NMOS transistor, metals that may be used for the gate electrode 110 include, but are not limited to, hafnium, zirconium, titanium, tantalum, aluminum, alloys of these metals, and carbides of these metals (e.g., hafnium carbide, zirconium carbide, titanium carbide, tantalum carbide, and aluminum carbide). In some embodiments, the gate electrode 110 may include a stack of two or more metal layers, where one or more metal layers are WF metal layers and at least one metal layer is a fill metal layer.

If used, the gate dielectric 112 may at least laterally surround the channel portion 114, and the gate electrode 110 may laterally surround the gate dielectric 112 such that the gate dielectric 112 is disposed between the gate electrode 110 and the channel material 102. In various embodiments, the gate dielectric 112 may include one or more high-k dielectric materials and may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric 112 may include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, tantalum oxide, tantalum silicon oxide, lead scandium tantalum oxide, and lead zinc niobate. In some embodiments, an annealing process may be carried out on the gate dielectric 112 during manufacture of the transistor 600 to improve the quality of the gate dielectric 112. In some embodiments, the gate dielectric 112 may have a thickness between about 0.5 nanometers and 3 nanometers, including all values and ranges therein, e.g., between about 1 and 3 nanometers, or between about 1 and 2 nanometers.

In some embodiments, the gate stack 108 may be surrounded by a dielectric spacer, not specifically shown in FIG. 1. The dielectric spacer may be configured to provide separation between the gate stacks 108 of different transistors 100 which may be provided adjacent to one another (e.g., different transistors 100 provided along a single fin if the transistors 100 are FinFETs), as well as between the gate stack 108 and one of the S/D contacts 106 that is disposed on the same side as the gate stack 108. Such a dielectric spacer may include one or more low-k dielectric materials. Examples of the low-k dielectric materials that may be used as the dielectric spacer include, but are not limited to, silicon dioxide, carbon-doped oxide, silicon nitride, fused silica glass (FSG), and organosilicates such as silsesquioxane, siloxane, and organosilicate glass. Other examples of low-k dielectric materials that may be used as the dielectric spacer include organic polymers such as polyimide, polynorbornenes, benzocyclobutene, perfluorocyclobutane, or polytetrafluoroethylene (PTFE). Still other examples of low-k dielectric materials that may be used as the dielectric spacer include silicon-based polymeric dielectrics such as hydrogen silsesquioxane (HSQ) and methylsilsesquioxane (MSQ). Other examples of low-k materials that may be used in a dielectric spacer include various porous dielectric materials, such as for example porous silicon dioxide or porous carbon-doped silicon dioxide, where large voids or pores are created in a dielectric in order to reduce the overall dielectric constant of the layer, since voids can have a dielectric constant of nearly 1.

As shown in FIG. 1, the second S/D contact 106-2 is provided on the same side as the gate stack 108, which may be considered to be the front side of the transistor 100, while the first S/D contact 106-1 is provided on the opposite side, which may be considered to be the back side of the transistor 100. Thus, the first S/D contact 106-1 is the back-side contact and the second S/D contact 106-2 is the front-side contact of the transistor 100. In other embodiments, both S/D contacts 106 may be provided on a single side of a transistor, e.g., on the front side (where the gate stack 108 is provided) or on the back side. Further, while the gate stack 108 is provided on the front side in FIG. 1, alternatively, the gate stack 108 may be provided on the back side.

Example Cell Architecture Cross Sections with Three M0 Routing Tracks

FIGS. 2A-2D provide cross-sections of four example cell and routing track architectures, according to some embodiments of the present disclosure. Each of FIGS. 2A-2D illustrate cross-sections of a device layer, an M0 layer over the device layer, and a BMO layer under the device layer.

A number of elements in FIGS. 2A-2D, 3C, 4A-4D, 5A-5B, and 6A-6B are illustrated in these figures with different patterns, with a legend showing the correspondence between the reference numerals and patterns being provided at the bottom of each drawing page containing these figures. For example, the legend illustrates that FIGS. 2A and 2B use different patterns to show a M0 routing track 202, a first diffusion region 204, a second diffusion region 206, a trench material 208, a via material 210, and a BMO metal 212.

The cross-sections illustrated in FIG. 2A-2D show a cross-section of a portion of each of two transistors, an n-type transistor and a p-type transistor. The transistors are in a device layer 222. The device layer 222 may be formed over a layer of silicon, not specifically shown in FIGS. 2A-2D. A M0 layer 220 is over the device layer 222, and a BMO layer 224 is below the device layer 222. The M0 layer 220 is on a front side of the device layer 222, and the BMO layer 224 is on a back side of the device layer 224 and may generally be referred to as a back side layer. Additional metal layers (e.g., M1, M2, etc.) may be formed over the M0 layer 220, as described further in relation to FIGS. 3 and 4. Furthermore, additional back side layers may be formed under the BMO layer 224.

The cells illustrated in FIGS. 2A-2D each include two transistors at different positions in the y-direction in the illustrated coordinate system. The cell height 226 indicates the height of the cell that includes the two transistors. The cell height 226 is one dimension of the cell; in the coordinate system shown, the cell height 226 refers to the dimension of the cell in the y-direction. Each cell may include four total transistors, arranged in a 2×2 grid, as illustrated in FIG. 4. The cell may also have a cell width (not illustrated in FIG. 2), which is a dimension of the cell in the x-direction. In some embodiments, the cell height 226 is less than 100 nanometers (nm). In some cases, the cell height 226 may be even shorter, e.g., less than 90 nm, less than 80 nm, less than 70 nm, less than 60 nm, or less than 50 nm. As discussed above, a cell architecture with three M0 routing tracks within the cell height 226 enables shorter cells than prior architectures.

The transistors are arranged with a source, gate, and drain extending in the x-direction (e.g., into the page) in the orientation shown, and each of FIGS. 2A-2D illustrates cross-section of a source or a drain of each of the two transistors. In particular, each transistor includes a source or drain formed in a respective diffusion region 204 and 206. The diffusion regions 204 and 206 may be of different types, e.g., the diffusion region 204 may be p-type and the diffusion region 206 may be n-type, or vice versa. The diffusion regions 204 may have source and drain regions formed therein, such as the S/D regions 104 described with respect to FIG. 1. The first transistor includes at least a portion of the first diffusion region 204, and the second transistor includes at least a portion of the second diffusion region 206. The diffusion regions 204 and 206 each extend in the x-direction. In some embodiments, the diffusion regions 204 and 206 each extend in the x-direction across multiple transistors, e.g., across two transistors in a 2×2 cell.

Figure 2B:
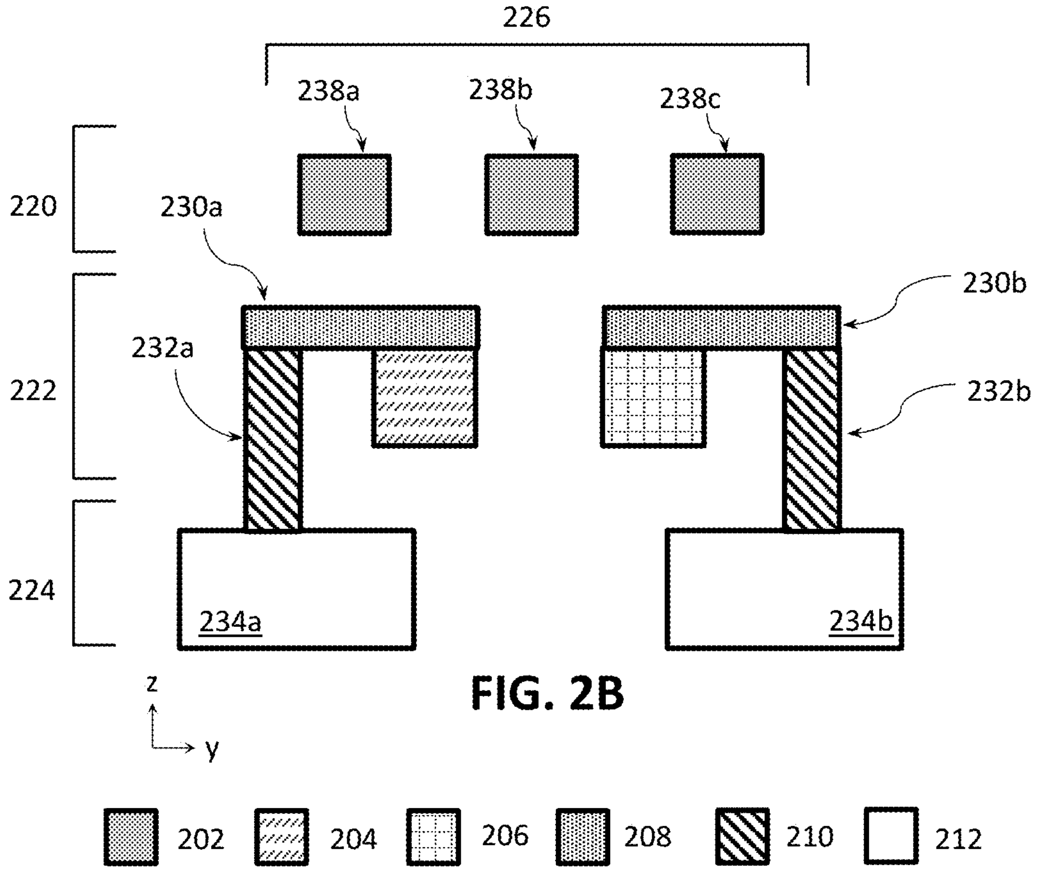

Turning specifically to FIGS. 2A and 2B, each of the diffusion regions 204 and 206 are coupled to a respective trench contact 230*a* or 230*b* formed over the diffusion region 204 or 206. Each trench contact 230*a* or 230*b* is coupled to a respective via 232*a* or 232*b*, which couples the trench contact 230*a* or 230*b* to a metal line 234*a* or 234*b* of the BMO layer 224. The metal lines 234*a* and 234*b* may be power lines, e.g., the metal line 234*a* may be set to a first power supply voltage (e.g., a positive supply voltage, referred to as Vcc), and the metal line 234*b* may be set to a second power supply voltage (e.g., a negative supply voltage, referred to as Vss). The metal lines 234*a* and 234*b* may be coupled to power circuitry not illustrated in FIG. 2 to provide the respective power supply voltages.

The trench contacts 230 are formed from the trench material 208, which may be any conductive material. The trench contacts 230 extend in the y-direction in the coordinate system shown in FIG. 2A. In particular, the trench contacts 230 extend away from a center of the cell and towards the edges of the cell, where the vias 232*a* and 232*b* are located.

The vias 232 are formed from a via material 210, which may be any conductive material. Each of the vias 232 may be implemented as a deep via at boundary (DVB), which is a deep through-silicon wall that connects to the trench contact 230 at the top and the BMO layer 224 (in particular, the metal lines 234) at the bottom. The DVB extends in the x-direction (e.g., into the page) in the orientation shown. A top view of an example DVB is illustrated in FIG. 3A. Alternatively, each of the vias 232 may be implemented as a deep through-silicon via which extends in the z-direction but does not extend in the x-direction. A top view of a deep through-silicon via is illustrated in FIG. 3B.

In the example shown in FIG. 2A, there are three M0 routing tracks 236*b*-236*d* fully within the cell height 226. There are also a pair of M0 routing tracks 236*a*, 236*e* that are partially within the cell height 226. Each of the routing tracks 236*a*-236*e* extends in the x-direction in the coordinate system shown, i.e., in the same direction as the diffusion regions 204 and 206. A boundary of the cell is along the routing tracks 236*a* and 236*e*. An adjacent cell may include the portion of the routing track 236*a* that is not within the cell height 226; similarly, and adjacent cell on the opposite side may include the portion of the routing track 236*e* that is not within the cell height 226.

In the example shown in FIG. 2B, there are three M0 routing tracks 238*a*-238*c* fully within the cell height 226. Each of the routing tracks 238*a*-238*c* extends in the x-direction in the coordinate system shown, i.e., in the same direction as the diffusion regions 204 and 206. A boundary of the cell is between adjacent routing tracks. For example, an adjacent cell with three routing tracks may be arranged to the left of the cell, with one of the routing tracks adjacent to the routing track 236*a*. Example top plan views of two adjacent cells are illustrated in FIGS. 6A and 6B.

Turning to FIGS. 2C and 2D, each of the diffusion regions 204 and 206 are coupled to a respective trench contact 230*a* or 230*b* formed over the diffusion region 204 or 206, which are similar to the trench contacts 230*a* and 230*b* illustrated in FIGS. 2A and 2B. In FIGS. 2C and 2D, each diffusion region 204 and 206 is coupled to a respective backside contact 240*a* or 240*b*, which couples the diffusion regions 204 and 206 to the respective metal lines 234*a* and 234*b* of the BMO layer 224. As described with respect to FIGS. 2A and 2B, the metal lines 234*a* and 234*b* may be power lines, e.g., the metal line 234*a* may be set to a first power supply voltage (e.g., a positive supply voltage, referred to as Vcc), and the metal line 234*b* may be set to a second power supply voltage (e.g., a negative supply voltage, referred to as Vss). The metal lines 234*a* and 234*b* may be coupled to power circuitry not illustrated in FIG. 2 to provide the respective power supply voltages to the diffusion regions 204 and 206 via the backside contacts 240*a* and 240*b*. The backside contacts 240*a* and 240*b* may be formed from any suitable conductive material 214.

In the example shown in FIG. 2C, there are three M0 routing tracks 236*b*-236*d* fully within the cell height 226. There are also a pair of M0 routing tracks 236*a*, 236*e* that are partially within the cell height 226. Each of the routing tracks 236*a*-236*e* extends in the x-direction in the coordinate system shown, i.e., in the same direction as the diffusion regions 204 and 206. A boundary of the cell is along the routing tracks 236*a* and 236*e*. An adjacent cell may include the portion of the routing track 236*a* that is not within the cell height 226; similarly, and adjacent cell on the opposite side may include the portion of the routing track 236*e* that is not within the cell height 226.

In the example shown in FIG. 2D, there are three M0 routing tracks 238*a*-238*c* fully within the cell height 226. Each of the routing tracks 238*a*-238*c* extends in the x-direction in the coordinate system shown, i.e., in the same direction as the diffusion regions 204 and 206. A boundary of the cell is between adjacent routing tracks. For example, an adjacent cell with three routing tracks may be arranged to the left of the cell, with one of the routing tracks adjacent to the routing track 236*a*. Example top plan views of two adjacent cells are illustrated in FIGS. 6A and 6B.

In FIGS. 2A and 2C, the routing tracks 236*b* and 236*d* are over respective diffusion regions 204 and 206. As further illustrated in FIGS. 4A and 4B, the routing track 236*b* is over a first transistor, and the routing track 236*d* is over a second transistor. The routing track 236*c*, which is adjacent to the routing tracks 236*b* and 236*d*, is between the two diffusion regions 204 and 206, and is between the two transistors.

In FIGS. 2B and 2D, the routing tracks 238*a* and 238*c* are over respective diffusion regions 204 and 206. As further illustrated in FIGS. 4C and 4D, the routing track 238*a* is over a first transistor, and the routing track 238*c* is over a second transistor. The routing track 238*b*, which is adjacent to the routing tracks 238*a* and 238*c*, is between the two diffusion regions 204 and 206, and is between the two transistors.

Each of the routing tracks 236 and 238 refers to a position of the M0 layer 220 that may include a metal trench. As noted above, each routing track 236 and 238 extends in the x-direction, and different portions of a given routing track may include metal, and other portions include an insulating material. Portions of the M0 layer 220 outside the routing tracks 236 and 238 typically include insulating material. Different arrangements of metal within each routing track 236 and 238 may be used to achieve different logic designs, e.g., to connect transistors in different ways.

Example Top-Down Views Illustrating Power Implementation

Figure 3C:
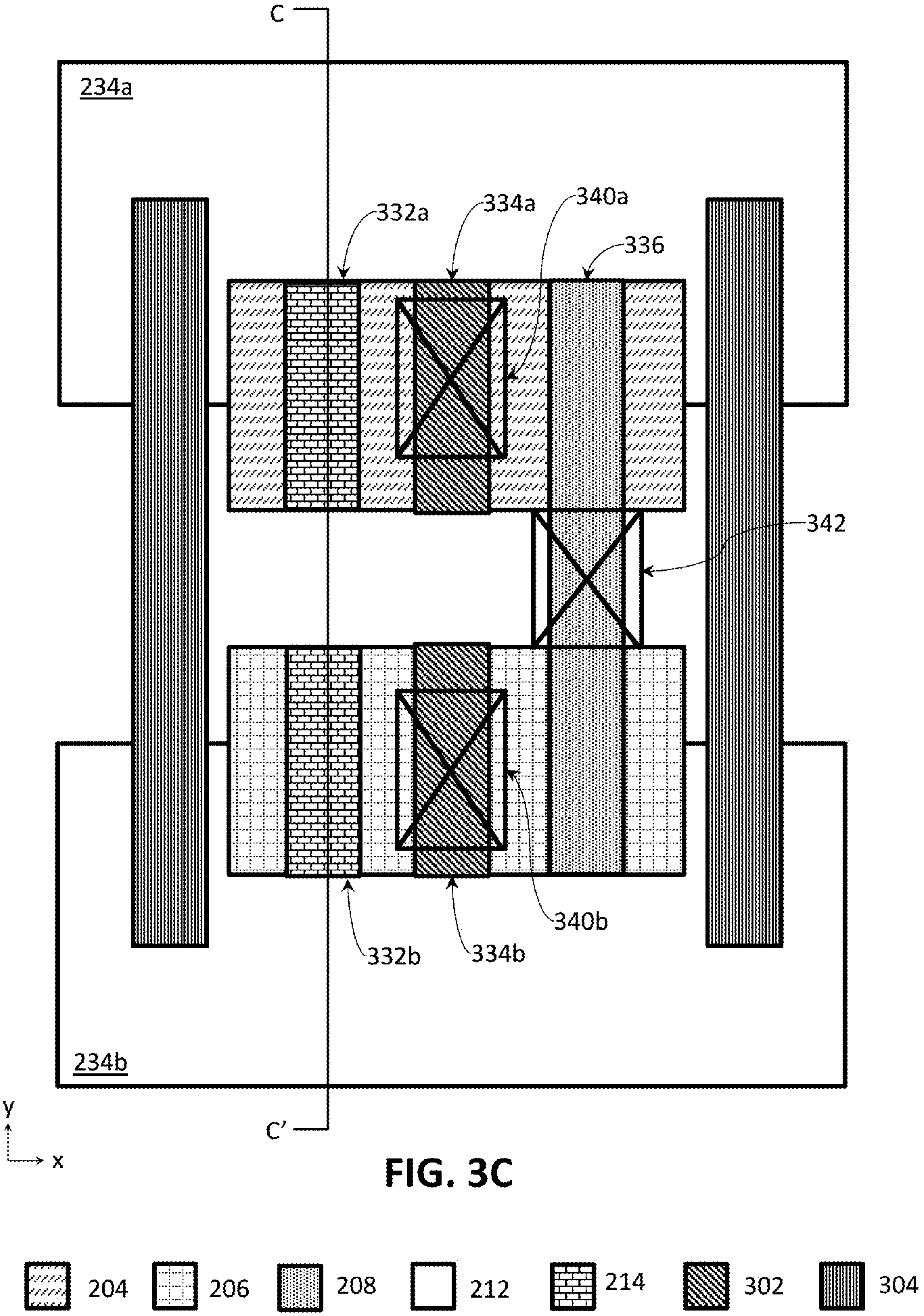

FIGS. 3A-3C provide top-down views illustrating power delivery options for transistors having the cell and routing track architectures disclosed herein, according to some embodiments of the present disclosure. Each of FIGS. 3A-3C illustrates two example transistors of different types, e.g., NMOS and PMOS. One transistor is formed over a first diffusion region 204 (e.g., a p-type diffusion region), and another transistor is formed over a second diffusion region 206 (e.g., an n-type diffusion region). In some embodiments, a cell includes two transistors, as illustrated in these figures. In other embodiments, a cell includes more transistors, e.g., four transistors (as illustrated in FIGS. 4A-4D and 6A-6B), six transistors, eight transistors, etc. Additional pairs of n-type and p-type transistors may be arranged in the x-direction in the coordinate system shown.

Turning to FIG. 3A, a first transistor includes two trench contacts 310*a* and 312 formed over the first diffusion region 204 and a gate 302 between the two trench contacts 310*a* and 312. A second transistor includes two trench contacts 310*b* and 312 formed over the second diffusion region 206 and the gate 302 between the two trench contacts 310*b* and 312. The gate 302 may be similar to the gate stack 108 described with respect to FIG. 1. In this example, a single gate 302 extends between the two transistors; in other embodiments, each transistor may have its own respective gate that is individually controlled, e.g., as illustrated in FIG. 3C. The trench contacts 310*a* and 310*b* on the left side of the gate 302 in the orientation shown are decoupled between the two transistors, while the trench contact 312 on the right side of the gate 302 extends between the two transistors. The trench contacts 208 may have other arrangements in other embodiments (e.g., the right trench contact 312 may be replaced by two distinct trench contacts, one for each transistor, as illustrated in FIG. 3B).

In this example, the left trench contacts 310*a* and 310*b* each extend towards the edges of the cell in the y-direction and are each coupled to a via 324*a* or 324*b*. FIG. 3A illustrates the example in which the vias 210 are DVBs, e.g., through-silicon walls extending in the x-direction, as described with respect to FIG. 2A. The cross-section AA' noted in FIG. 3A may be the cross-section shown in FIG. 2A or FIG. 2B. The cell height 226 corresponds to the cell height 226 illustrated in FIGS. 2A and 2B. FIG. 3A further includes two regions of full trench isolation (FTI) 304 on either side of the width of the cell. The FTI 304 extends as a wall in the y-direction, and provides electrical isolation of neighboring cells (e.g., between the cell illustrated in FIG. 3A and another cell to the left or right).

FIG. 3A also illustrates two example vias 320 and 322 coupling the gate 302 and the trench contact 312, respectively, to the M0 layer (not specifically illustrated in FIG. 3A). The M0 layers extend in the x-direction, and the vias 320 and 322 are coupled to different M0 routing tracks in the example shown. The locations of the vias 320 and 322 may be different in different embodiments, e.g., to couple the gate 302 and the trench contact 312 to different routing tracks based on the desired signal pathways for the device including the illustrated cell.

Turning to FIG. 3B, a first transistor includes two trench contacts 310*a* and 314*a* formed over the first diffusion region 204 and a gate 302 between the two trench contacts 310*a* and 314*a*. A second transistor includes two trench contacts 310*b* and 314*b* formed over the second diffusion region 206 and the gate 302 between the two trench contacts 310*b* and 314*b*. The gate 302 may be similar to the gate stack 108 described with respect to FIG. 1. In this example, a single gate 302 extends between the two transistors; in other embodiments, each transistor may have its own respective gate that is individually controlled, e.g., as illustrated in FIG. 3C. The trench contacts 310*a* and 310*b* on the left side of the gate 302 in the orientation shown are decoupled between the two transistors, and the trench contacts 314*a* and 314*b* on the left side of the gate 302 are also decoupled between the two transistors. The trench contacts 314 may have other arrangements in other embodiments (e.g., a single right trench contact may extend between the two transistors, as illustrated in FIG. 3A).

In this example, the left trench contacts 310*a* and 310*b* each extend towards the edges of the cell in the y-direction and are each coupled to a via 330*a* or 330*b*. FIG. 3B illustrates the example in which the vias 210 are deep through-silicon vias that extend in the z-direction but do not extend in the x- or y-direction. The cross-section BB' noted in FIG. 3B may be the cross-section shown in FIG. 2A or FIG. 2B. The cell height 226 corresponds to the cell height 226 illustrated in FIGS. 2A and 2B. FIG. 3B further includes two regions of FTI 304 on either side of the width of the cell. The FTI 304 extends as a wall in the y-direction, and provides electrical isolation of neighboring cells (e.g., between the cell illustrated in FIG. 3B and another cell to the left or right).

In addition to the vias 330*a* and 330*b*, FIG. 3B further illustrates three example vias 326*a*, 326*b*, and 328. While the vias 330*a* and 330*b* extend into the page towards the BMO layer (e.g., as illustrated in FIGS. 2A and 2B), the vias

326*a*, 326*b*, and 328 extend out of the page, up to the M0 layer. The vias 326*a* and 326*b* couple the trench contacts 314*a* and 314*b* formed over the diffusion regions 204 and 206 to metal lines in the M0 layer, while the via 328 couples the gate 302 to a different metal line of the M0 layer. The M0 layer is not specifically illustrated in FIG. 3B. The M0 layers extend in the x-direction, and the vias 326*a*, 326*b*, and 328 are each coupled to a different one of three M0 routing tracks in the example shown. The locations of the vias 326*a*, 326*b*, and 328 may be different in different embodiments, e.g., to couple the gate 302 and the trench contacts 314*a* and 314*b* to different routing tracks based on the desired signal pathways for the device including the illustrated cell.

Turning to FIG. 3C, a first transistor includes two trench contacts 332*a* and 336 formed over the first diffusion region 204 and a gate 334*a* between the two trench contacts 332*a* and 336. A second transistor includes two trench contacts 332*b* and 336 formed over the second diffusion region 206 and the gate 334*b* between the two trench contacts 310*b* and 314*b*. The gates 334*a* and 334*b* may be similar to the gate stack 108 described with respect to FIG. 1. In this example, each transistor has its own gate 334*a* or 334*b* that is individually controlled; in other embodiments, the transistors may share a single gate that extends between the two transistors, e.g., as illustrated in FIGS. 3A and 3B. The trench contacts 332*a* and 332*b* on the left side of the gates 334*a* and 334*b* in the orientation shown are decoupled between the two transistors, while the trench contact 336 on the right side of the gates 334*a* and 334*b* extends between the two transistors. The trench contacts 208 may have other arrangements in other embodiments (e.g., the right trench contact 336 may be replaced by two distinct trench contacts, one for each transistor, as illustrated in FIG. 3B).

In this example, the left trench contacts 332*a* and 332*b* are each direct backside contacts 214, as illustrated in FIGS. 2C and 2D. The cross-section CC' noted in FIG. 3C may be the cross-section shown in FIG. 2C or FIG. 2D. The cell height 226 corresponds to the cell height 226 illustrated in FIGS. 2C and 2D. FIG. 3C further includes two regions of FTI 304 on either side of the width of the cell. The FTI 304 extends as a wall in the y-direction, and provides electrical isolation of neighboring cells (e.g., between the cell illustrated in FIG. 3C and another cell to the left or right).

FIG. 3C further illustrates three example vias 340*a*, 340*b*, and 342. The vias 340*a*, 340*b*, and 342 extend out of the page, up to the M0 layer. The vias 340*a* and 340*b* couple the gates 334*a* and 334*b* formed over the diffusion regions 204 and 206 to metal lines in the M0 layer, while the via 342 couples the trench contact 336 to a different metal line of the M0 layer. The M0 layer is not specifically illustrated in FIG. 3C. The M0 layers extend in the x-direction, and the vias 340*a*, 340*b*, and 342 are each coupled to a different one of three M0 routing tracks in the example shown. The locations of the vias 340*a*, 340*b*, and 342 may be different in different embodiments, e.g., to couple the gates 334*a* and 334*b* and the trench contact 316 to different routing tracks based on the desired signal pathways for the device including the illustrated cell.

Example Top-Down Views Illustrating Routing Tracks

FIGS. 4A-4D provide top-down views illustrating routing tracks for high density cell architectures, according to some embodiments of the present disclosure. Each of FIGS. 4A-4D illustrates a respective example cell 400*a*-400*d* that includes sets of example transistors of different types, e.g., NMOS and PMOS. In particular, two transistors are formed over a first diffusion region 204 (e.g., a p-type diffusion region), and another two transistors are formed over a second diffusion region 206 (e.g., an n-type diffusion region). In these embodiments, each cell 400*a*-400*d* includes four transistors. A source or drain is shared by two transistors formed over each diffusion region 204 or 206. In particular, two gate lines 410*a* and 410*b* are illustrated in each of FIGS. 4A-4D. While the source and drains are not specifically shown, it should be understood that a source or drain region is formed on either side of the gate lines 410*a* and 410*b* to realize the transistors. Furthermore, a single source or drain region between the two gate lines 410*a* and 410*b* of each transistor is a shared S/D, i.e., shared by a left transistor and a right transistor in the orientation of FIG. 4A-4D.

Each of FIGS. 4A-4D further illustrates example arrangements of M0 routing tracks 402 and M1 routing tracks 404 over a cell consisting of multiple transistors (in these examples, four transistors). The source, gates, and drains of the transistors in the cells illustrated in FIGS. 4A-4D may have various routings to the M0 routing tracks 402 and to the BMO routing tracks below the device layer, e.g., any of the arrangements illustrated in FIGS. 2A-2D and 3A-3C. The BMO layer and lower layers are not specifically illustrated in FIGS. 4A-4D. Furthermore, the M2 layer and upper layers are not specifically illustrated in FIG. 4A-4D. However, in some embodiments, the M2 layer has similar routing tracks to the M0 layer, e.g., the routing tracks of the M2 layer are formed over corresponding routing tracks of the M0 layer. Furthermore, while the gates 302 and diffusion regions 204 and 206 are illustrated in FIGS. 4A-4D to indicate the positions of the transistors within the cells, the focus of FIGS. 4A-4D is on the metal layers formed over the cells, and other specific transistor features are not illustrated to simplify the drawings.

Turning to FIG. 4A, the cell 400*a* includes five M0 routing tracks 402 are arranged at a pitch 420. If M2 routing tracks are aligned to the M0 routing tracks, the M2 routing tracks are also arranged at the pitch 420. The individual M0 routing tracks are labeled 442*a*-442*e* in FIG. 4A. The M0 routing tracks 442*a*-442*e* may correspond to top views of the M0 routing tracks 236*a*-236*e* illustrated in FIGS. 2A and 2C, e.g., the cross-section DD' noted in FIG. 4A may be the cross-section shown in FIG. 2A or FIG. 2C. The routing track 442*b* is over the diffusion region 204 and the source, gate, and drain of the transistors formed over the diffusion region 204. The routing track 442*d* is over the diffusion region 206 and the source, gate, and drain of the transistors formed over the diffusion region 206. The routing track 442*c* is between and adjacent to the routing tracks 442*b* and 442*d*, and the routing track 442*c* is arranged over a portion of the device layer between the diffusion regions 204 and 206.

Three M1 routing tracks 404 are arranged at a pitch 422. The individual M1 routing tracks are labeled 444*a*-444*c* in FIG. 4A. The pitch 422 may be the same as the gate pitch 424, i.e., a distance between the center lines of the gate lines 410*a* and 410*b*. The cell has a height 226 in the y-direction, as illustrated in FIGS. 2 and 3.

FIG. 4A illustrates several example V0 vias 406, which refer to vias between the trenches in the M0 routing tracks 402 and trenches in the M1 routing tracks 404. In this example arrangement the V0 via 430*a* is coupled the M0 routing track 442*b* and the M1 routing track 444*a*; the V0 via 430*b* is coupled to the M0 routing track 442*d* and the M1 routing track 444*a*; and the V0 via 430*c* is coupled to the M0 routing track 442*c* and the M1 routing track 444*c*. As noted above, the routing tracks 402 and 404 indicate areas in which trenches may be formed, but trenches typically do not run along the full routing track; instead, portions of metal within a routing track are separated by portions of insulating material, forming individual trenches. For example, the V0 vias 430*a* and 430*b* may be coupled to different trenches within the M1 routing track 444*a*, where the trenches are not in direct contact with each other but instead are separated by an insulating portion (e.g., an insulating portion within the M1 routing track 444*a* that is directly over the M0 routing track 442*c*).

FIG. 4A also illustrates example gate vias 408, which couple the gates 302 to trenches in the M0 routing tracks 402. The gate vias 408 may be at different positions from those illustrated, e.g., to couple gates 302 to different ones of the M0 routing tracks 402.

Figure 4B:
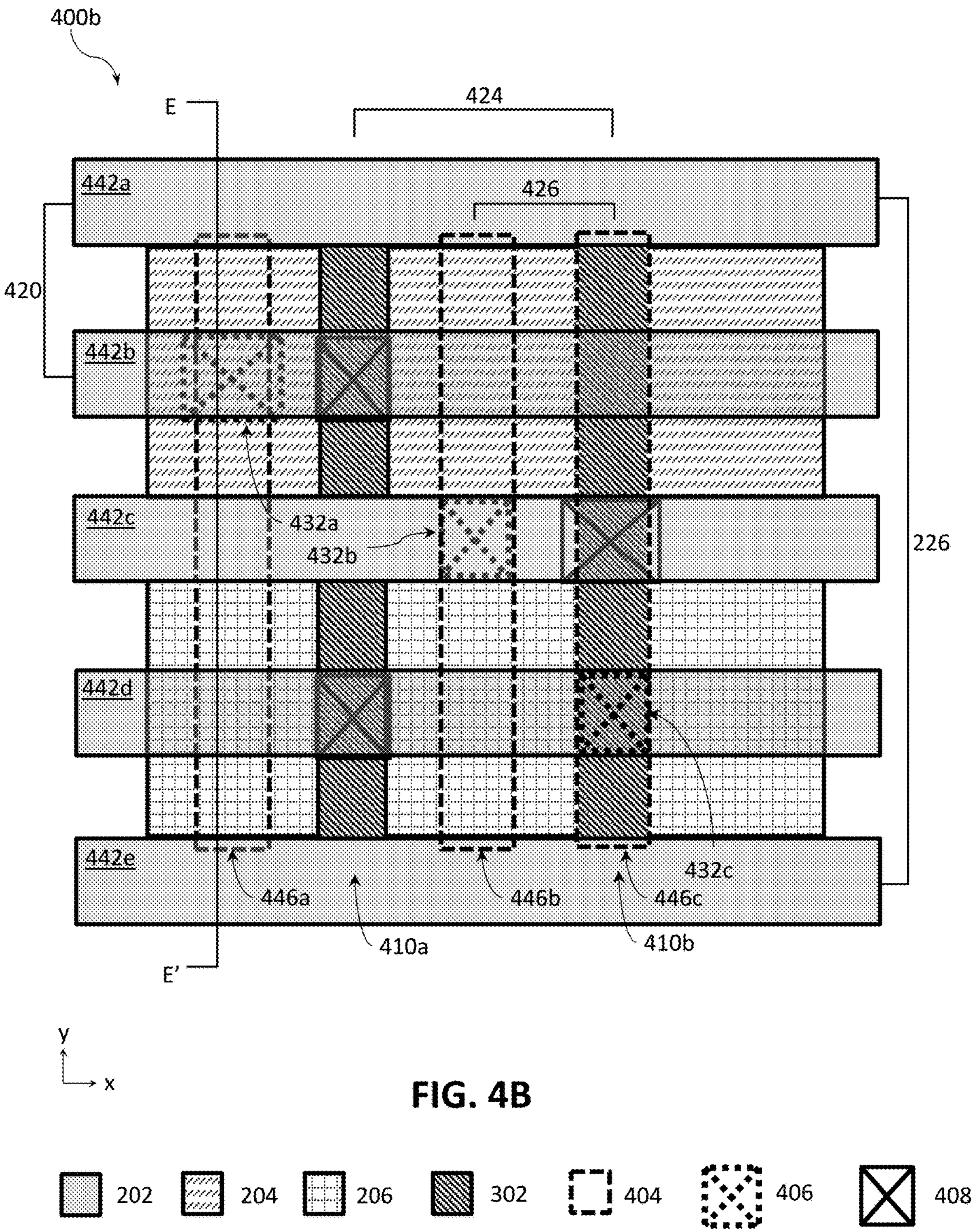

Turning to FIG. 4B, the cell 400*b* includes five M0 routing tracks 402 are arranged at the pitch 420. If M2 routing tracks are aligned to the M0 routing tracks, the M2 routing tracks are also arranged at the pitch 420. The individual M0 routing tracks are labeled 442*a*-442*e* in FIG. 4B, and are similar to the routing tracks 442*a*-442*e* shown in FIG. 4A and described above. The M0 routing tracks 442*a*-442*e* may correspond to top views of the M0 routing tracks 236*a*-236*e* illustrated in FIGS. 2A and 2C, e.g., the cross-section EE' noted in FIG. 4B may be the cross-section shown in FIG. 2A or FIG. 2C.

Three M1 routing tracks 404 are arranged with a minimum pitch 426. The individual M1 routing tracks are labeled 446*a*-446*c* in FIG. 4B. While three example M1 routing tracks 446 are illustrated, in some embodiments, more or different routing tracks 446 at the pitch indicated by the minimum pitch 426 may be included. For example, a routing track may be formed over the gate line 410*a*. The minimum pitch 426 may half the gate pitch 424. The cell has a height 226 in the y-direction, as illustrated in FIGS. 2 and 3.

FIG. 4B illustrates several example V0 vias 406, which refer to vias between the trenches in the M0 routing tracks 402 and trenches in the M1 routing tracks 404. In this example arrangement the V0 via 432*a* is coupled the M0 routing track 442*b* and the M1 routing track 446*a*; the V0 via 432*b* is coupled to the M0 routing track 442*c* and the M1 routing track 446*b*; and the V0 via 432*c* is coupled to the M0 routing track 442*d* and the M1 routing track 446*c*. As noted above, the routing tracks 402 and 404 indicate areas in which trenches may be formed, but trenches typically do not run along the full routing track; instead, portions of metal within a routing track are separated by portions of insulating material, forming individual trenches.

FIG. 4B also illustrates example gate vias 408, which couple the gates 302 to trenches in the M0 routing tracks 402. The gate vias 408 may be at different positions from those illustrated, e.g., to couple gates 302 to different ones of the M0 routing tracks 402.

Turning to FIG. 4C, the cell 400*c* includes three M0 routing tracks 402 are arranged at a pitch 428. If M2 routing tracks are aligned to the M0 routing tracks, the M2 routing tracks are also arranged at the pitch 428. The individual M0 routing tracks are labeled 448*a*-448*c* in FIG. 4C. The M0 routing tracks 448*a*-448*c* may correspond to top views of the M0 routing tracks 238*a*-238*c* illustrated in FIGS. 2B and 2D, e.g., the cross-section FF' noted in FIG. 4C may be the cross-section shown in FIG. 2B or FIG. 2D. The routing track 448*a* is over the diffusion region 204 and the source, gate, and drain of the transistors formed over the diffusion region 204. The routing track 448*c* is over the diffusion region 206 and the source, gate, and drain of the transistors formed over the diffusion region 206. The routing track 448*b* is between and adjacent to the routing tracks 448*a* and 448*c*, and the routing track 448*b* is arranged over a portion of the device layer between the diffusion regions 204 and 206.

Three M1 routing tracks 404 are arranged at the pitch 422. The individual M1 routing tracks are labeled 450*a*-450*c* in FIG. 4C. The pitch 422 may be the same as the gate pitch 424, i.e., a distance between the center lines of the gate lines 410*a* and 410*b*, as described with respect to FIG. 4A. The cell has a height 226 in the y-direction, as illustrated in FIGS. 2 and 3.

FIG. 4C illustrates several example V0 vias 406, which refer to vias between the trenches in the M0 routing tracks 402 and trenches in the M1 routing tracks 404. In this example arrangement the V0 via 434*a* is coupled the M0 routing track 448*a* and the M1 routing track 450*a*; the V0 via 434*b* is coupled to the M0 routing track 448*c* and the M1 routing track 450*a*; and the V0 via 434*c* is coupled to the M0 routing track 448*b* and the M1 routing track 450*c*. As noted above, the routing tracks 402 and 404 indicate areas in which trenches may be formed, but trenches typically do not run along the full routing track; instead, portions of metal within a routing track are separated by portions of insulating material, forming individual trenches, as described with respect to FIG. 4A.

FIG. 4C also illustrates example gate vias 408, which couple the gates 302 to trenches in the M0 routing tracks 402. The gate vias 408 may be at different positions from those illustrated, e.g., to couple gates 302 to different ones of the M0 routing tracks 402.

Turning to FIG. 4D, the cell 400*d* includes three M0 routing tracks 402 are arranged at the pitch 428. If M2 routing tracks are aligned to the M0 routing tracks, the M2 routing tracks are also arranged at the pitch 428. The individual M0 routing tracks are labeled 448*a*-448*c* in FIG. 4D, and are similar to the routing tracks 448*a*-448*c* shown in FIG. 4C and described above. The M0 routing tracks 448*a*-448*c* may correspond to top views of the M0 routing tracks 238*a*-238*c* illustrated in FIGS. 2B and 2D, e.g., the cross-section GG' noted in FIG. 4D may be the cross-section shown in FIG. 2B or FIG. 2D.

Three M1 routing tracks 404 are arranged with a minimum pitch 426, which may be the minimum pitch 426 illustrated in FIG. 4B. The individual M1 routing tracks are labeled 452*a*-452*c* in FIG. 4D. While three example M1 routing tracks 452 are illustrated, in some embodiments, more or different routing tracks 452 at the pitch indicated by the minimum pitch 426 may be included. For example, a routing track may be formed over the gate line 410*a*. The minimum pitch 426 may half the gate pitch 424. The cell has a height 226 in the y-direction, as illustrated in FIGS. 2 and 3.

FIG. 4D illustrates several example V0 vias 406, which refer to vias between the trenches in the M0 routing tracks 402 and trenches in the M1 routing tracks 404. In this example arrangement the V0 via 436*a* is coupled the M0 routing track 448*a* and the M1 routing track 452*a*; the V0 via 436*b* is coupled to the M0 routing track 448*b* and the M1 routing track 452*b*; and the V0 via 436*c* is coupled to the M0 routing track 448*c* and the M1 routing track 452*c*. As noted above, the routing tracks 402 and 404 indicate areas in which trenches may be formed, but trenches typically do not run along the full routing track; instead, portions of metal within a routing track are separated by portions of insulating material, forming individual trenches.

FIG. 4D also illustrates example gate vias 408, which couple the gates 302 to trenches in the M0 routing tracks 402. The gate vias 408 may be at different positions from those illustrated, e.g., to couple gates 302 to different ones of the M0 routing tracks 402.

Examples of Adjacent Cells

Figure 5A:
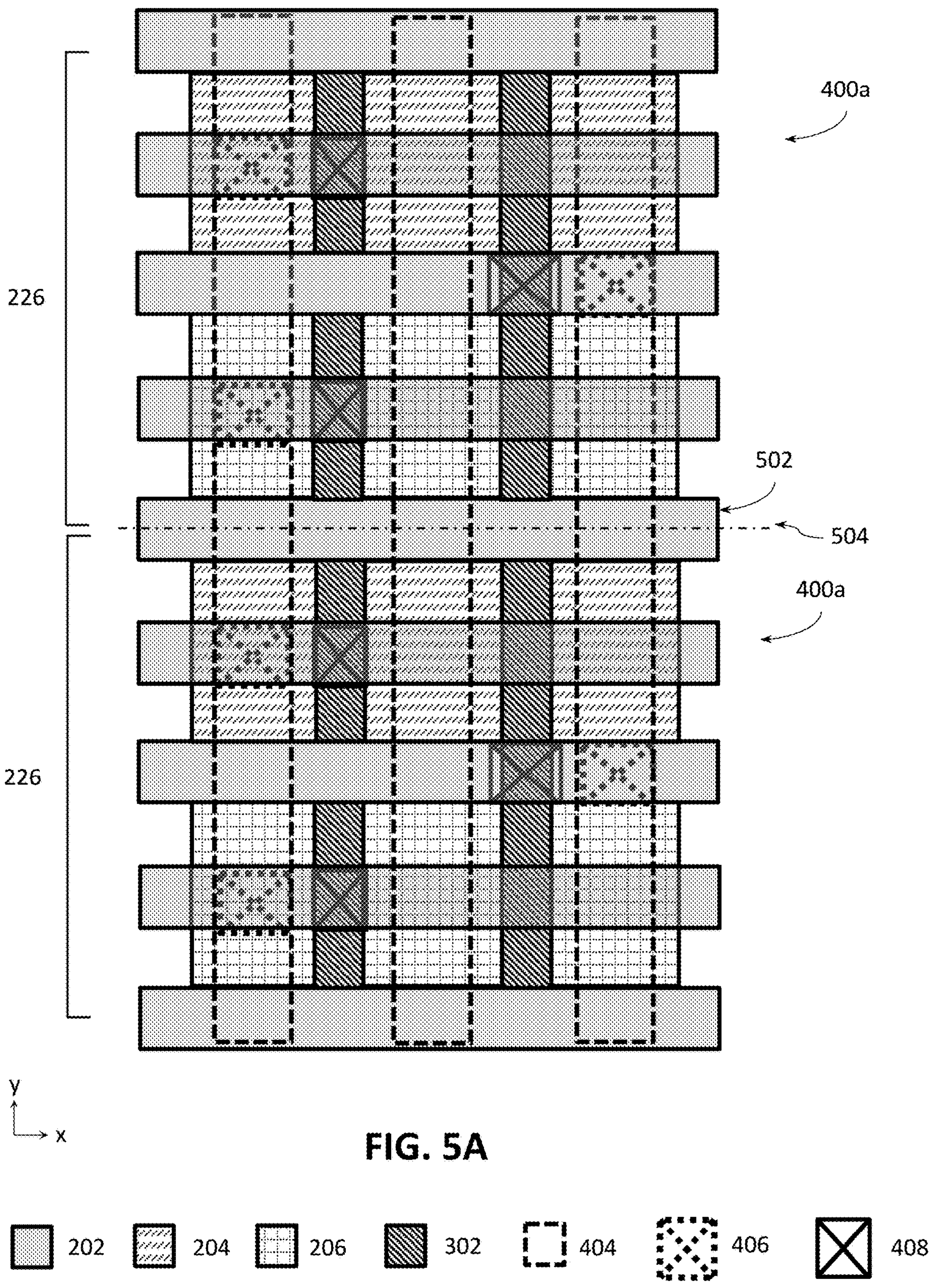

FIGS. 5A and 5B provide top-down views of pairs of adjacent cells, according to some embodiments of the present disclosure. FIG. 5A illustrates two of the cells 400*a* illustrated in FIG. 4A adjacent to each other in the y-direction. Each of the cells 400*a* has the height 226 in the y-direction. As described with respect to FIG. 4A, each of the cells includes three M0 routing tracks 402 fully within the cell. One M0 routing track, labelled 502 in FIG. 5A, is along a boundary of the two cells. The boundary is shown by the dashed line 504. The routing track 502 along the boundary 504 may not be coupled to either cell 400*a*. Other cells with a M0 routing track along the boundary, such as the cell 400*c* illustrated in FIG. 4C, may be arranged in a similar manner to the arrangement illustrated in FIG. 5A.

FIG. 5B illustrates two of the cells 400*b* illustrated in FIG. 4B adjacent to each other in the y-direction. Each of the cells 400*b* has the height 226 in the y-direction. As described with respect to FIG. 4B, each of the cells includes three M0 routing tracks 402 fully within the cell. The boundary of the two cells, labelled 510, is in a region between the M0 routing tracks labelled 506 and 508. Other cells with a region between two M0 routing tracks along the boundary, such as the cell 400*d* illustrated in FIG. 4D, may be arranged in a similar manner to the arrangement illustrated in FIG. 5B.

Example Routing from Transistor to M0 Routing Tracks

FIGS. 6A and 6B provide cross-section views illustrating example routing between a diffusion region and a M0 routing track, according to some embodiments of the present disclosure. FIGS. 6A and 6B each illustrate cross-sections of the device layer and M0 layer taken through the diffusion regions 204 and 206 and the trench contacts 208, e.g., through source regions or drain regions of a pair of transistors. Each of FIGS. 6A and 6B provide examples in which a source or drain region of a transistor is coupled to a M0 routing track 202 that is not directly over the source or drain region. Instead, a trench contact extending in the y-direction couples the source or drain region to a M0 routing track 202 that is not directly over the source or drain region, e.g., not over the diffusion region 204.

Turning specifically to FIG. 6A, the cross-section illustrates three M0 routing tracks 612*a*, 612*b*, and 612*c*. These may be similar to the routing tracks 238*a*-238*c* illustrated in FIGS. 2B and 2D. Alternatively, the M0 routing tracks may be similar to the routing tracks 236*a*-236*d* illustrated in FIGS. 2A and 2C. The routing track 612*a* is over the first diffusion region 204, the routing track 612*c* is over the second diffusion region 206, and the routing track 612*b* is between and adjacent to the routing tracks 612*a* and 612*c*, and between the diffusion regions 204 and 206. The routing track 612*b* is coupled to a first portion 614 of trench contact material 208. The first portion 614 is only coupled to the second routing track 612*b*, and is not coupled to (e.g., is not in contact with) the routing tracks 612*a* or 612*c*. The first portion 614 is over a second portion 616 of the trench contact material 208 that extends in the y-direction, and in particular, extends between the second routing track 612*b* to a region over the first diffusion region 204. A third portion 618 of the trench contact material 208 couples the second portion 616 to the first diffusion region 204. Thus, the trench contact material 208 couples the routing track 612*b* to the first diffusion region 204. In other embodiments, the trench contact material 208 may couple the third routing track 612*c* to the first diffusion region 204, e.g., as shown in FIG. 6B.

An isolation material 602 is formed over the second diffusion region 206 so that the second diffusion region 206 is not electrically coupled to the second routing track 612*b* or to the first diffusion region 204. In this example, the second and third portions 616 and 618 of the trench contact material 208 may be formed in a single process step, e.g., a single deposition step after the isolation material 602 is formed. The first portion 614 may be deposited in the same process step or in a different process step.

Turning to FIG. 6B, the cross-section illustrates three M0 routing tracks 622*a*, 622*b*, and 622*c*, which are similar to the routing tracks 622*a*, 622*b*, and 622*c* described with respect to FIG. 6A. The routing track 622*a* is over the first diffusion region 204, the routing track 622*c* is over the second diffusion region 206, and the routing track 622*b* is between and adjacent to the routing tracks 622*a* and 622*c*, and between the diffusion regions 204 and 206. In this example, the routing track 622*c* is coupled to a first portion 624 of trench contact material 208. The first portion 624 is only coupled to the third routing track 622*c*, and is not coupled to (e.g., is not in contact with) the routing tracks 622*a* or 622*b*. The first portion 624 is over a second portion 626 of the trench contact material 208 that extends in the y-direction, and in particular, extends between the third routing track 622*c* to a region over the first diffusion region 204. A second trench contact material 604 couples the second portion 626 to the first diffusion region 204. Thus, the trench contact material 208 and 604 couple the routing track 622*c* to the first diffusion region 204. In other embodiments, the trench contact material 208 and 604 may couple the second routing track 622*b* to the first diffusion region 204, e.g., as shown in FIG. 6A.

An isolation material 602 is formed over the second diffusion region 206 so that the second diffusion region 206 is not electrically coupled to the third routing track 622*c* or to the first diffusion region 204. In this example, the second portion 626 of the trench contact material 208 and the trench contact material 604 may be formed in different process steps, e.g., a first deposition step or process is used to deposit the trench contact material 604, and a second deposition step or process is used to deposit the trench contact material 208. The trench contact materials 208 and 604 may be the same material or a different material.

Example Electronic Devices

The high density transistor and routing track architectures described herein may be included in any suitable electronic device. FIGS. 7-10 illustrate various examples of devices and components that may include any of the transistor and routing track architectures described herein.

Figure 7A:
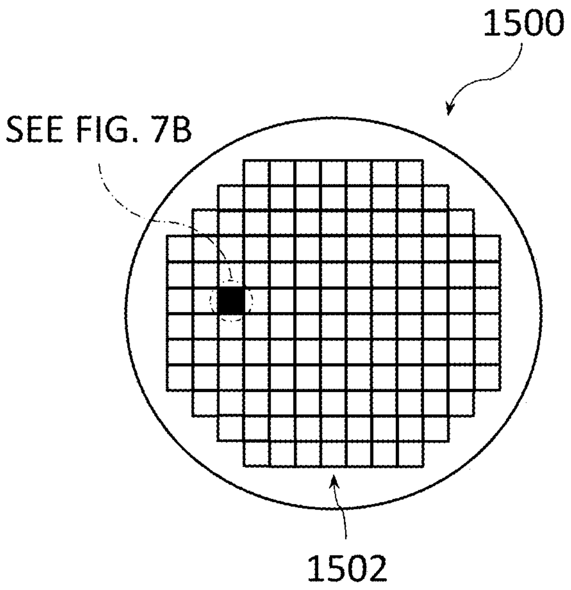
FIGS. 7A and 7B are top views of, respectively, a wafer and dies that may include transistor and routing track architectures as described herein in accordance with any of the embodiments disclosed herein.
Figure 7B:
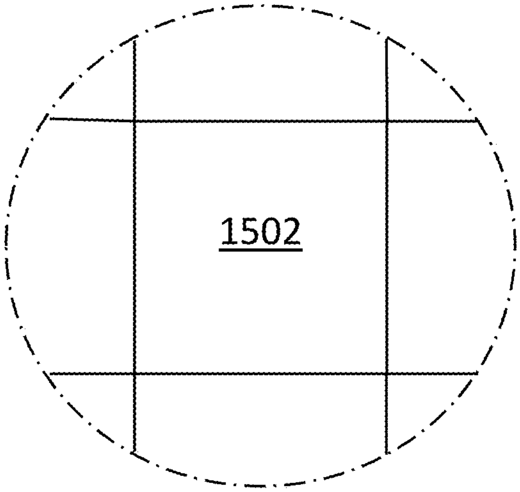

FIGS. 7A and 7B are top views of a wafer and dies that include transistor and routing track architectures as described herein in accordance with any of the embodiments disclosed herein. The wafer 1500 may be composed of semiconductor material and may include one or more dies 1502 having IC structures formed on a surface of the wafer 1500. Each of the dies 1502 may be a repeating unit of a semiconductor product that includes any suitable IC structure (e.g., the IC structures as shown in any of FIG. 1, 2, or 4-6, or any further embodiments of the IC structures described herein). After the fabrication of the semiconductor product is complete (e.g., after manufacture of one or more IC structures with transistor and routing track architectures as described herein, included in a particular electronic component, e.g., in a transistor or in a memory device), the wafer 1500 may undergo a singulation process in which each of the dies 1502 is separated from one another to provide discrete "chips" of the semiconductor product. In particular, devices that include transistor and routing track architectures as described herein may take the form of the wafer 1500 (e.g., not singulated) or the form of the die 1502 (e.g., singulated). The die 1502 may include one or more transistors (e.g., one or more of the transistors 1640 of FIG. 8, discussed below) and/or supporting circuitry to route electrical signals to the transistors, as well as any other IC components. In some embodiments, the wafer 1500 or the die 1502 may include a memory device (e.g., an SRAM device), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 10) or other logic that is configured to store information in the memory devices or execute instructions stored in the memory array.

Figure 8:
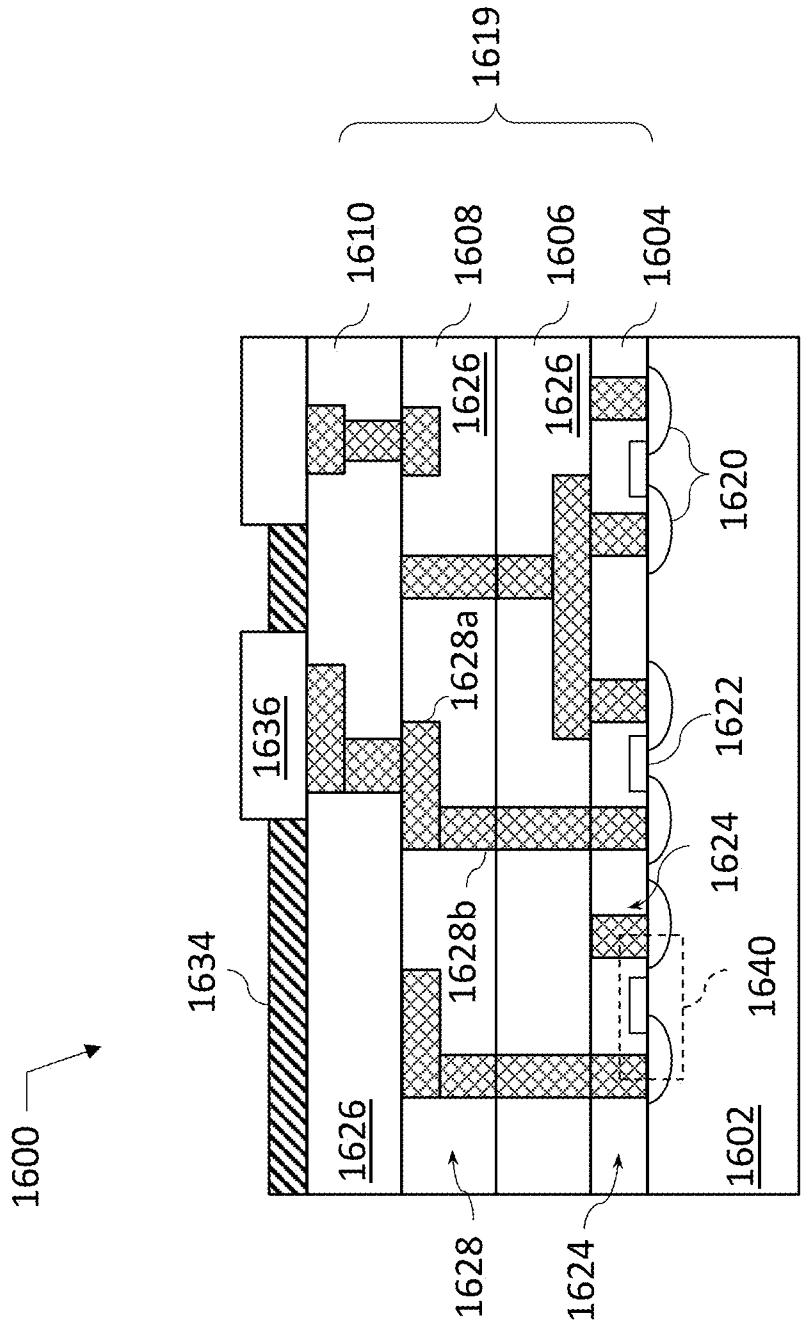
FIG. 8 is a cross-sectional side view of an IC package that may include transistor and routing track architectures as described herein in accordance with any of the embodiments disclosed herein.

FIG. 8 is a cross-sectional side view of an IC device 1600 that may include transistor and routing track architectures as described herein. The IC device 1600 may be formed on a substrate 1602 (e.g., the wafer 1500 of FIG. 7A) and may be included in a die (e.g., the die 1502 of FIG. 7B). The substrate 1602 may be any substrate as described herein. The substrate 1602 may be part of a singulated die (e.g., the dies 1502 of FIG. 7B) or a wafer (e.g., the wafer 1500 of FIG. 7A).

The IC device 1600 may include one or more device layers 1604 disposed on the substrate 1602. The device layer 1604 may include features of one or more transistors 1640 (e.g., metal oxide semiconductor field-effect transistors (MOSFETs)) formed on the substrate 1602. The device layer 1604 may include, for example, one or more source and/or drain (S/D) regions 1620, a gate 1622 to control current flow in the transistors 1640 between the S/D regions 1620, and one or more S/D contacts 1624 to route electrical signals to/from the S/D regions 1620. The transistors 1640 may include additional features not depicted for the sake of clarity, such as device isolation regions, gate contacts, and the like. The transistors 1640 are not limited to the type and configuration depicted in FIG. 8 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1640 may include a gate 1622 formed of at least two layers, a gate electrode layer and a gate dielectric layer.

The gate electrode layer may be formed on the gate interconnect support layer and may consist of at least one P-type workfunction metal or N-type workfunction metal, depending on whether the transistor is to be a PMOS or an NMOS transistor, respectively. In some implementations, the gate electrode layer may consist of a stack of two or more metal layers, where one or more metal layers are workfunction metal layers and at least one metal layer is a fill metal layer. Further metal layers may be included for other purposes, such as a barrier layer or/and an adhesion layer.

For a PMOS transistor, metals that may be used for the gate electrode include, but are not limited to, ruthenium, palladium, platinum, cobalt, nickel, and conductive metal oxides, e.g., ruthenium oxide. A P-type metal layer will enable the formation of a PMOS gate electrode with a workfunction that is between about 4.9 electron Volts (eV) and about 5.2 eV. For an NMOS transistor, metals that may be used for the gate electrode include, but are not limited to, hafnium, zirconium, titanium, tantalum, aluminum, alloys of these metals, and carbides of these metals such as hafnium carbide, zirconium carbide, titanium carbide, tantalum carbide, aluminum carbide, tungsten, tungsten carbide. An N-type metal layer will enable the formation of an NMOS gate electrode with a workfunction that is between about 3.9 eV and about 4.2 eV.

In some embodiments, when viewed as a cross-section of the transistor 1640 along the source-channel-drain direction, the gate electrode may be formed as a U-shaped structure that includes a bottom portion substantially parallel to the surface of the substrate and two sidewall portions that are substantially perpendicular to the top surface of the substrate. In other embodiments, at least one of the metal layers that form the gate electrode may simply be a planar layer that is substantially parallel to the top surface of the substrate and does not include sidewall portions substantially perpendicular to the top surface of the substrate. In other embodiments, the gate electrode may be implemented as a combination of U-shaped structures and planar, non-U-shaped structures. For example, the gate electrode may be implemented as one or more U-shaped metal layers formed atop one or more planar, non-U-shaped layers. In some embodiments, the gate electrode may consist of a V-shaped structure (e.g., when a fin of a FinFET transistor does not have a "flat" upper surface, but instead has a rounded peak).

Generally, the gate dielectric layer of a transistor 1640 may include one layer or a stack of layers, and the one or more layers may include silicon oxide, silicon dioxide, and/or a high-k dielectric material. The high-k dielectric material included in the gate dielectric layer of the transistor 1640 may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric layer include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric layer to improve its quality when a high-k material is used.

The S/D regions 1620 may be formed within the substrate 1602 adjacent to the gate 1622 of each transistor 1640, using any suitable processes known in the art. For example, the S/D regions 1620 may be formed using either an implantation/diffusion process or a deposition process. In the former process, dopants such as boron, aluminum, antimony, phosphorous, or arsenic may be ion-implanted into the substrate 1602 to form the S/D regions 1620. An annealing process that activates the dopants and causes them to diffuse farther into the substrate 1602 may follow the ion implantation process. In the latter process, an epitaxial deposition process may provide material that is used to fabricate the S/D regions 1620. In some implementations, the S/D regions 1620 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1620 may be formed using one or more alternate semiconductor materials such as germanium or a group III-V material or alloy. In further embodiments, one or more layers of metal and/or metal alloys may be used to form the S/D regions 1620. In some embodiments, an etch process may be performed before the epitaxial deposition to create recesses in the substrate 1602 in which the material for the S/D regions 1620 is deposited.

Electrical signals, such as power and/or input/output (I/O) signals, may be routed to and/or from the transistors 1640 of the device layer 1604 through one or more interconnect layers disposed on the device layer 1604 (illustrated in FIG. 8 as interconnect layers 1606-1610). For example, electrically conductive features of the device layer 1604 (e.g., the gate 1622 and the S/D contacts 1624) may be electrically coupled with the interconnect structures 1628 of the interconnect layers 1606-1610. The one or more interconnect layers 1606-1610 may form an ILD stack 1619 of the IC device 1600.

The interconnect structures 1628 may be arranged within the interconnect layers 1606-1610 to route electrical signals according to a wide variety of designs (in particular, the arrangement is not limited to the particular configuration of interconnect structures 1628 depicted in FIG. 8). Although a particular number of interconnect layers 1606-1610 is depicted in FIG. 8, embodiments of the present disclosure include IC devices having more or fewer interconnect layers than depicted.

In some embodiments, the interconnect structures 1628 may include trench contact structures 1628*a* (sometimes referred to as "lines") and/or via structures 1628*b* (sometimes referred to as "holes") filled with an electrically conductive material such as a metal. The trench contact structures 1628*a* may be arranged to route electrical signals in a direction of a plane that is substantially parallel with a surface of the substrate 1602 upon which the device layer 1604 is formed. For example, the trench contact structures 1628*a* may route electrical signals in a direction in and out of the page from the perspective of FIG. 8. The via structures 1628*b* may be arranged to route electrical signals in a direction of a plane that is substantially perpendicular to the surface of the substrate 1602 upon which the device layer 1604 is formed. In some embodiments, the via structures 1628*b* may electrically couple trench contact structures 1628*a* of different interconnect layers 1606-1610 together.

The interconnect layers 1606-1610 may include a dielectric material 1626 disposed between the interconnect structures 1628, as shown in FIG. 8. The dielectric material 1626 may take the form of any of the embodiments of the dielectric material provided between the interconnects of the IC structures disclosed herein.

In some embodiments, the dielectric material 1626 disposed between the interconnect structures 1628 in different ones of the interconnect layers 1606-1610 may have different compositions. In other embodiments, the composition of the dielectric material 1626 between different interconnect layers 1606-1610 may be the same.

A first interconnect layer 1606 (referred to as Metal 1 or "M1") may be formed directly on the device layer 1604. In some embodiments, the first interconnect layer 1606 may include trench contact structures 1628*a* and/or via structures 1628*b*, as shown. The trench contact structures 1628*a* of the first interconnect layer 1606 may be coupled with contacts (e.g., the S/D contacts 1624) of the device layer 1604.

A second interconnect layer 1608 (referred to as Metal 2 or "M2") may be formed directly on the first interconnect layer 1606. In some embodiments, the second interconnect layer 1608 may include via structures 1628*b* to couple the trench contact structures 1628*a* of the second interconnect layer 1608 with the trench contact structures 1628*a* of the first interconnect layer 1606. Although the trench contact structures 1628*a* and the via structures 1628*b* are structurally delineated with a line within each interconnect layer (e.g., within the second interconnect layer 1608) for the sake of clarity, the trench contact structures 1628*a* and the via structures 1628*b* may be structurally and/or materially contiguous (e.g., simultaneously filled during a dual-damascene process) in some embodiments.

A third interconnect layer 1610 (referred to as Metal 3 or "M3") (and additional interconnect layers, as desired) may be formed in succession on the second interconnect layer 1608 according to similar techniques and configurations described in connection with the second interconnect layer 1608 or the first interconnect layer 1606.

The IC device 1600 may include a solder resist material 1634 (e.g., polyimide or similar material) and one or more bond pads 1636 formed on the interconnect layers 1606-1610. The bond pads 1636 may be electrically coupled with the interconnect structures 1628 and configured to route the electrical signals of the transistor(s) 1640 to other external devices. For example, solder bonds may be formed on the one or more bond pads 1636 to mechanically and/or electrically couple a chip including the IC device 1600 with another component (e.g., a circuit board). The IC device 1600 may have other alternative configurations to route the electrical signals from the interconnect layers 1606-1610 than depicted in other embodiments. For example, the bond pads 1636 may be replaced by or may further include other analogous features (e.g., posts) that route the electrical signals to external components.

Figure 9:
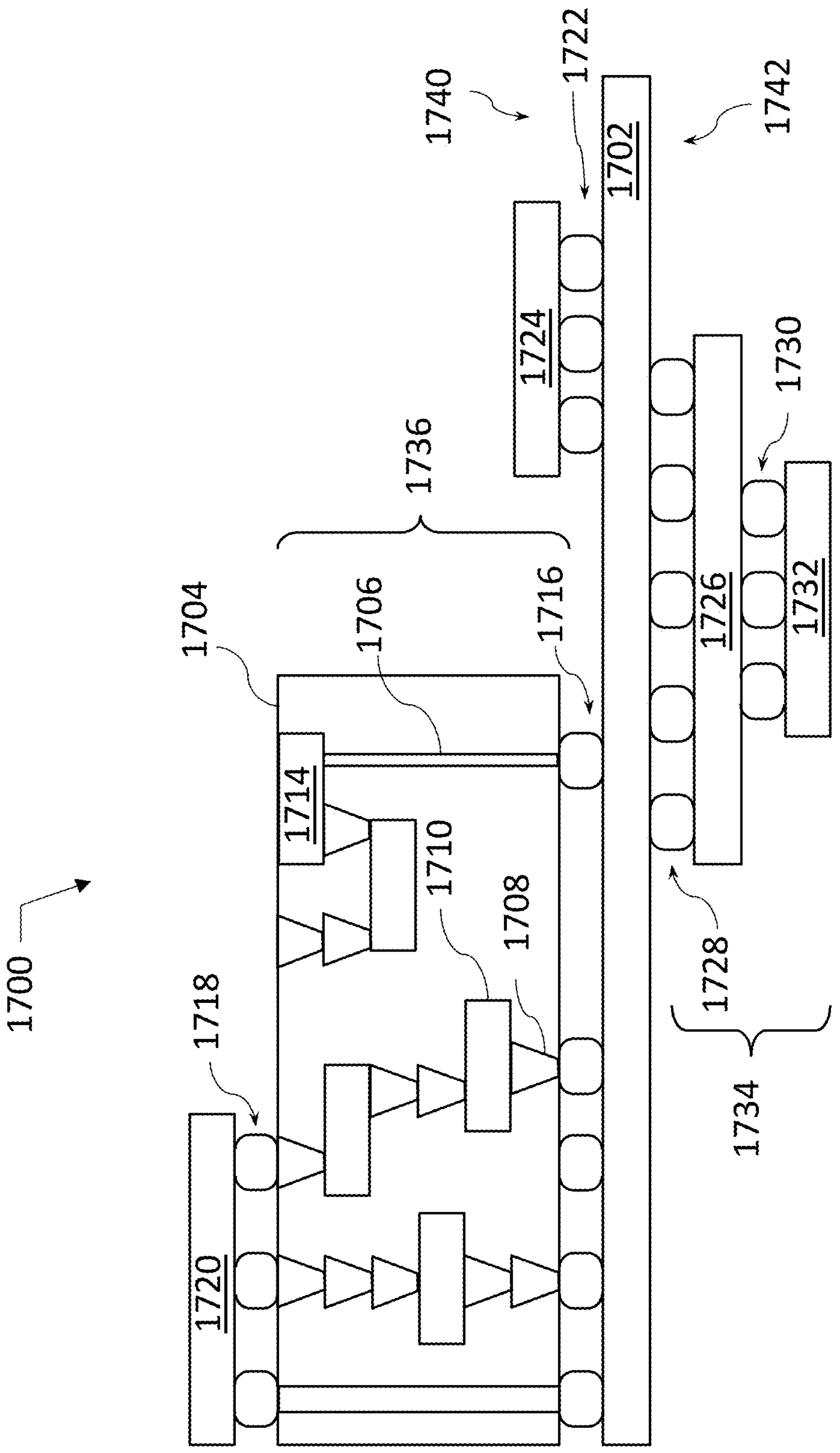
FIG. 9 is a cross-sectional side view of an IC device assembly that may include transistor and routing track architectures as described herein in accordance with any of the embodiments disclosed herein.

FIG. 9 is a cross-sectional side view of an IC device assembly 1700 that may include components having or being associated with (e.g., being electrically connected by means of) transistor and routing track architectures as described herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. In particular, any suitable ones of the components of the IC device assembly 1700 may include any of the transistor and routing track architectures as described herein.

In some embodiments, the circuit board 1702 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 9 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702 and may include solder balls (as shown in FIG. 9), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 9, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die (the die 1502 of FIG. 7B), an IC device (e.g., the IC device 1600 of FIG. 8), or any other suitable component. In some embodiments, the IC package 1720 may include devices including transistor and routing track architectures as described herein. Generally, the interposer 1704 may spread a connection to a wider pitch or reroute a connection to a different connection. For example, the interposer 1704 may couple the IC package 1720 (e.g., a die) to a ball grid array (BGA) of the coupling components 1716 for coupling to the circuit board 1702. In the embodiment illustrated in FIG. 9, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

The interposer 1704 may be formed of an epoxy resin, a fiberglass-reinforced epoxy resin, a ceramic material, or a polymer material such as polyimide. In some implementations, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to TSVs 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer 1704. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 9 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 10:
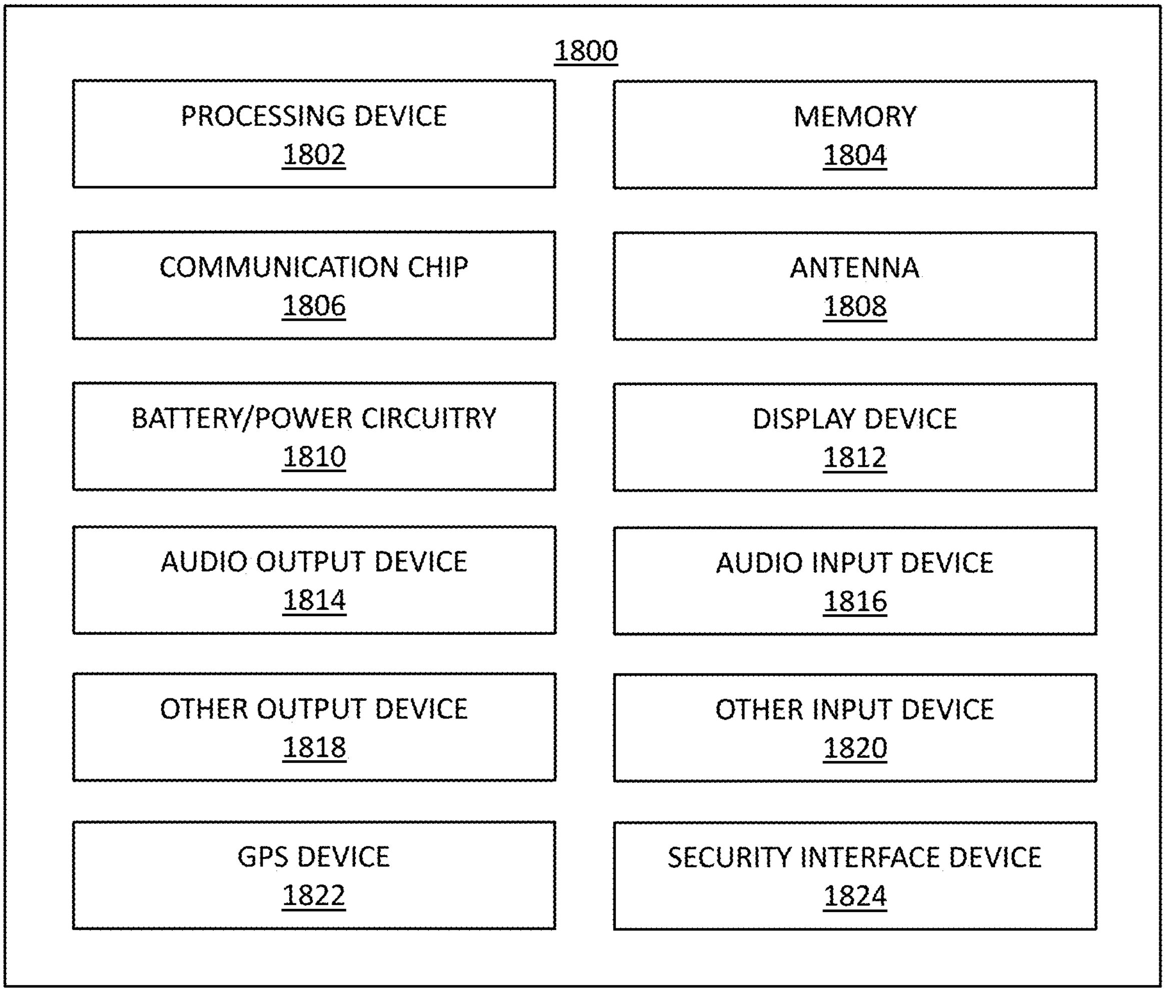
FIG. 10 is a block diagram of an example computing device that may include transistor and routing track architectures as described herein in accordance with any of the embodiments disclosed herein.

FIG. 10 is a block diagram of an example computing device 1800 that may include one or more components including transistor and routing track architectures as described herein. For example, any suitable ones of the components of the computing device 1800 may include a die (e.g., the die 1502 of FIG. 7B) having transistor and routing track architectures as described herein. Any one or more of the components of the computing device 1800 may include, or be included in, an IC device 1600 (FIG. 8). Any one or more of the components of the computing device 1800 may include, or be included in, an IC device assembly 1700 (FIG. 9).

A number of components are illustrated in FIG. 10 as included in the computing device 1800, but any one or more of these components may be omitted or duplicated, as suitable for the application. In some embodiments, some or all of the components included in the computing device 1800 may be attached to one or more motherboards. In some embodiments, some or all of these components are fabricated onto a single system-on-a-chip (SoC) die.

Additionally, in various embodiments, the computing device 1800 may not include one or more of the components illustrated in FIG. 10, but the computing device 1800 may include interface circuitry for coupling to the one or more components. For example, the computing device 1800 may not include a display device 1806, but may include display device interface circuitry (e.g., a connector and driver circuitry) to which a display device 1806 may be coupled. In another set of examples, the computing device 1800 may not include an audio input device 1824 or an audio output device 1808 but may include audio input or output device interface circuitry (e.g., connectors and supporting circuitry) to which an audio input device 1824 or audio output device 1808 may be coupled.

The computing device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the computing device 1800 may include a communication chip 1812 (e.g., one or more communication chips). For example, the communication chip 1812 may be configured for managing wireless communications for the transfer of data to and from the computing device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The computing device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The computing device 1800 may include battery/power circuitry 1814. The battery/power circuitry 1814 may include one or more energy storage devices (e.g., batteries or capacitors) and/or circuitry for coupling components of the computing device 1800 to an energy source separate from the computing device 1800 (e.g., AC line power).

The computing device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display, for example.

The computing device 1800 may include an audio output device 1808 (or corresponding interface circuitry, as discussed above). The audio output device 1808 may include any device that generates an audible indicator, such as speakers, headsets, or earbuds, for example.

The computing device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The computing device 1800 may include a GPS device 1818 (or corresponding interface circuitry, as discussed above). The GPS device 1818 may be in communication with a satellite-based system and may receive a location of the computing device 1800, as known in the art.

The computing device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The computing device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1800 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1800 may be any other electronic device that processes data.

Select Examples

The following paragraphs provide various examples of the embodiments disclosed herein.

Example 1 provides a transistor cell including a first transistor including a portion of a first diffusion region of a first type, the first diffusion region extending in a first direction; a second transistor including a portion of a second diffusion region of a second type, the second diffusion region extending in the first direction; and a metal layer over the first transistor and the second transistor, the metal layer including a plurality of routing tracks arranged at a first pitch, each routing track extending in the first direction; where a first routing track is over the first diffusion region; a second routing track is over the second diffusion region; and a third routing track is between the first diffusion region and the second diffusion region, and the third routing track is adjacent to the first routing track and the second routing track.

Example 2 provides the transistor cell of Example 1, where the portion of the first diffusion region includes a source, the source coupled to a back side metal layer under the first transistor.

Example 3 provides the transistor cell of Example 2, further including a trench contact coupled to the source, the trench contact between the source and the metal layer; and a deep via coupled to the back side metal layer and trench contact.

Example 4 provides the transistor cell of Example 2, further including a backside contact coupling the source to the back side metal layer.

Example 5 provides the transistor cell of Example 1, further including a third transistor including a second portion of the first diffusion region, the first transistor having a first gate, and the third transistor having a second gate, the first gate and the second gate arranged at a second pitch.

Example 6 provides the transistor cell of Example 5, further including a second metal layer over the metal layer, the second metal layer having a second plurality of routing tracks arranged at the second pitch.

Example 7 provides the transistor cell of Example 5, further including a second metal layer over the metal layer, the second metal layer having a second plurality of routing tracks arranged at a third pitch, the third pitch less than the second pitch.

Example 8 provides the transistor cell of Example 1, where the transistor cell has a height extending across the first routing track, second routing track, and third routing track in a direction perpendicular to the first direction of less than 100 nm.

Example 9 provides the transistor cell of Example 1, further including a second metal layer over the metal layer; and a third metal layer over the second metal layer, the third metal layer including a second plurality of routing tracks arranged at the first pitch.

Example 10 provides the transistor cell of Example 1, where a metal region in the first routing track over the first diffusion region is coupled to a source or drain in the second diffusion region.

Example 11 provides the transistor cell of Example 10, where a contact region couples the metal region to the source or drain, and an isolation region is between the first diffusion region and the contact region.

Example 12 provides the transistor cell of Example 11, where the contact region includes a first portion in a same layer as the isolation region, and a second portion over the first portion and over the isolation region, the second portion coupled to the metal region.

Example 13 provides a device including a first cell including a first transistor having a first gate and a second transistor having a second gate, the first gate and the second gate arranged along a gate line extending in a first direction; a second cell including a third transistor having a third gate and a fourth transistor having a fourth gate, the third gate and the fourth gate arranged along the gate line; and a metal layer over the first cell and the second cell, the metal layer including a plurality of routing tracks arranged at a first pitch, each routing track extending in a second direction perpendicular to the first direction, and the plurality of routing tracks including a first routing track over the first gate; a second routing track over the second gate; and a third routing track between and adjacent to the first routing track and the second routing track.

Example 14 provides the device of Example 13, the plurality of routing tracks further including a fourth routing track over the third gate.

Example 15 provides the device of Example 14, where the fourth routing track is adjacent to the first routing track.

Example 16 provides the device of Example 14, the plurality of routing tracks further including a fifth routing track between and adjacent to the first routing track and the fourth routing track.

Example 17 provides the device of Example 13, the first transistor further including a source or drain region, the first cell further including a fifth transistor including the source or drain region of the first transistor; and a fifth gate.

Example 18 provides the device of Example 17, the second transistor further including a second source or drain region, the first cell further including a sixth transistor including the second source or drain region of the second transistor; and a sixth gate.

Example 19 provides the device of Example 13, further including a second metal layer over the metal layer, the second metal layer including a second plurality of routing tracks arranged at a second pitch, each routing track extending the first direction.

Example 20 provides the device of Example 13, where the first cell has a height extending in the first direction of less than 100 nm.

Example 21 provides a method for forming a device, the method including forming a first transistor including a portion of a first diffusion region of a first type, the first diffusion region extending in a first direction; forming a second transistor including a portion of a second diffusion region of a second type, the second diffusion region extending in the first direction; and forming a first metal line over the first transistor; forming a second metal line over the second transistor; and forming a third metal line in a same layer as the first metal line and the second metal line, the third metal line adjacent to the first metal line and the second metal line, the third metal line not over the first transistor or the second transistor.

Example 22 provides the method of Example 21, further including forming a plurality of metal lines over the first metal line, second metal line, and third metal line, the plurality of metal lines extending perpendicular to the first metal line, second metal line, and third metal line.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A transistor cell comprising:

a first transistor comprising a portion of a first diffusion region of a first type, the first diffusion region extending in a first direction;

a second transistor comprising a portion of a second diffusion region of a second type, the second diffusion region extending in the first direction; and a metal layer over the first transistor and the second transistor, the metal layer comprising a plurality of routing tracks arranged at a first pitch, each routing track extending in the first direction; wherein:

the transistor cell has a cell height extending in a second direction perpendicular to the first direction, and a first boundary and a second boundary at opposite ends of the cell height;

a first routing track is over the first diffusion region, and the first routing track is adjacent to the first boundary;

a second routing track is over the second diffusion region and the second routing track is adjacent to the second boundary; and a third routing track is between the first diffusion region and the second diffusion region, and the third routing track is adjacent to the first routing track and the second routing track.

2. The transistor cell of claim 1, wherein the portion of the first diffusion region comprises a source, the source coupled to a back side metal layer under the first transistor.

3. The transistor cell of claim 2, further comprising:

a trench contact coupled to the source, the trench contact between the source and the metal layer; and a deep via coupled to the back side metal layer and trench contact.

4. The transistor cell of claim 2, further comprising a backside contact coupling the source to the back side metal layer.

5. The transistor cell of claim 1, further comprising a third transistor comprising a second portion of the first diffusion region, the first transistor having a first gate, and the third transistor having a second gate, the first gate and the second gate arranged at a second pitch.

6. The transistor cell of claim 5, further comprising a second metal layer over the metal layer, the second metal layer having a second plurality of routing tracks arranged at the second pitch.

7. The transistor cell of claim 5, further comprising a second metal layer over the metal layer, the second metal layer having a second plurality of routing tracks arranged at a third pitch, the third pitch less than the second pitch.

8. The transistor cell of claim 1, wherein the cell height is less than 100 nm.

9. The transistor cell of claim 1, further comprising:

a second metal layer over the metal layer; and a third metal layer over the second metal layer, the third metal layer comprising a second plurality of routing tracks arranged at the first pitch.

10. The transistor cell of claim 1, wherein a metal region in the first routing track over the first diffusion region is coupled to a source or drain in the second diffusion region.

11. The transistor cell of claim 10, wherein a contact region couples the metal region to the source or drain, and an isolation region is between the first diffusion region and the contact region.

12. The transistor cell of claim 11, wherein the contact region comprises:

a first portion in a same layer as the isolation region, and a second portion over the first portion and over the isolation region, the second portion coupled to the metal region.

13. The transistor cell of claim 1, further comprising:

a fourth routing track along the first boundary; and a fifth routing track along the second boundary.

14. A device comprising:

a first cell comprising a first transistor having a first gate and a second transistor having a second gate, the first gate and the second gate arranged along a gate line extending in a first direction;

a second cell comprising a third transistor having a third gate and a fourth transistor having a fourth gate, the third gate and the fourth gate arranged along the gate line; and a metal layer over the first cell and the second cell, the metal layer comprising a plurality of routing tracks arranged at a first pitch, each routing track extending in a second direction perpendicular to the first direction, and the plurality of routing tracks comprising:

a first routing track over the first gate;

a second routing track over the second gate;

a third routing track between and adjacent to the first routing track and the second routing track; and a fourth routing track over the third gate in the second cell, wherein the second routing track is separated from the fourth routing track by at most one routing track.

15. The device of claim 14, the plurality of routing tracks further comprising a fifth routing track between and adjacent to the first routing track and the fourth routing track.

16. The device of claim 14, the first transistor further comprising a source or drain region, the first cell further comprising a fifth transistor comprising:

the source or drain region of the first transistor; and a fifth gate.

17. The device of claim 16, the second transistor further comprising a second source or drain region, the first cell further comprising a sixth transistor comprising:

the second source or drain region of the second transistor; and a sixth gate.

18. The device of claim 14, wherein the first cell has a cell height extending in the first direction, and a first boundary and a second boundary at opposite ends of the cell height, the first routing track is adjacent to the first boundary, and the second routing track is adjacent to the second boundary.

19. A method for forming a device, the method comprising:

forming a first transistor comprising a portion of a first diffusion region of a first type, the first diffusion region extending in a first direction;

forming a second transistor comprising a portion of a second diffusion region of a second type, the second diffusion region extending in the first direction;

forming a first metal line over the first transistor;

forming a second metal line over the second transistor; and forming a third metal line in a same layer as the first metal line and the second metal line, the third metal line adjacent to the first metal line and the second metal line, the third metal line not over the first transistor or the second transistor;

wherein the first transistor and the second transistor are in a cell having a cell height extending in a second direction perpendicular to the first direction, and a first boundary and a second boundary at opposite ends of the cell height, the first metal line is adjacent to the first boundary, and the second metal line is adjacent to the second boundary.

20. The method of claim 19, further comprising forming a plurality of metal lines over the first metal line, second metal line, and third metal line, the plurality of metal lines extending perpendicular to the first metal line, second metal line, and third metal line.

* * * * *